United States Patent [19]
Hagiwara

[11] Patent Number: 5,656,930
[45] Date of Patent: Aug. 12, 1997

[54] METHOD FOR DETERMINING THE ANISOTROPIC PROPERTIES OF A SUBTERRANEAN FORMATION CONSISTING OF A THINLY LAMINATED SAND/SHALE SEQUENCE USING AN INDUCTION TYPE LOGGING TOOL

[75] Inventor: Teruhiko Hagiwara, Houston, Tex.

[73] Assignee: Halliburton Company, Houston, Tex.

[21] Appl. No.: 383,862

[22] Filed: Feb. 6, 1995

[51] Int. Cl.$^6$ .................................................... G01V 3/10
[52] U.S. Cl. ........................... 324/339; 324/338; 364/422
[58] Field of Search ............................. 324/338, 339, 324/340, 341, 343, 323; 364/420, 422; 73/151–153

[56] References Cited

U.S. PATENT DOCUMENTS

| | | | |
|---|---|---|---|
| 3,697,864 | 10/1972 | Runge | 324/366 |
| 3,808,520 | 4/1974 | Runge | 324/343 |
| 4,636,731 | 1/1987 | Savage et al. | 324/343 |
| 4,739,255 | 4/1988 | Hagiwara | 324/152 |
| 4,899,112 | 2/1990 | Clark et al. | 324/338 |
| 5,233,522 | 8/1993 | Sinclair | 364/422 |
| 5,329,448 | 7/1994 | Rosthal | 364/422 |

OTHER PUBLICATIONS

Morani, J. H. and Kunz, K.S., *Basic Theory of Induction Logging and Application to Study of Two–Coil Sondes*, Oct. 14, 1985, pp. 829–858.

Primary Examiner—Sandra L. O'Shea
Assistant Examiner—J. M. Patidar

[57] ABSTRACT

Formation anisotropic properties are determined using knowledge of the borehole dip angle and an induction logging instrument to obtain two formation derived resistivities. Separate shale layer anisotropic properties are further determined utilizing the logging instrument in a like manner. A sand resistivity and a net/gross ratio may be derived from the formation and shale layer anisotropic information.

33 Claims, 27 Drawing Sheets

METHOD FOR DETERMINING THE ANISOTROPIC PROPERTIES OF A SUBTERRANEAN FORMATION CONSISTING OF A THINLY LAMINATED SAND/SHALE SEQUENCE USING AN INDUCTION TYPE LOGGING TOOL

BACKGROUND OF THE INVENTION

This invention relates generally to the field of earth borehole logging and, more specifically relates to a method for determining anisotropic properties of subterranean formations surrounding an earth borehole.

It is well known that subterranean formations surrounding an earth borehole can be anisotropic with regard to the conduction of electrical currents. The phenomenon of electrical anisotropy is generally visualized in one of two ways, or a combination thereof, as follows.

In many sedimentary strata, electric current flows more easily in a direction parallel to the bedding planes rather than in a direction perpendicular to them. A reason for this anisotropy is that a great number of mineral crystals possess a flat or elongated shape (e.g. mica and kaolin). At the time they were laid down, they naturally took an orientation parallel to the plane of sedimentation. The interstices in the formations are, therefore, generally parallel to the bedding plane, and the current is able to travel with facility along these interstices which often contain electrically conductive mineralized water. Such electrical anisotropy, sometimes called microscopic anisotropy, is observed mostly in shales.

If a cylindrical sample is cut from a subterranean formation, parallel to the bedding planes, the resistivity of this sample measured with a current flowing along its axis is called the transverse (or horizontal) resistivity $R_h$. The inverse of $R_h$ is the horizontal conductivity, $\sigma_h$. If a similar cylinder is cut perpendicular to the bedding plane, the resistivity measured with a current flowing along its axis is called the longitudinal (or vertical) resistivity $R_v$. The inverse of $R_v$ is the vertical conductivity, $\sigma_v$. The anisotropy coefficient $\alpha$, by definition, is equal to:

$$\sqrt{\frac{R_h}{R_v}} \text{ or } \sqrt{\frac{\sigma_v}{\sigma_h}} . \quad (1)$$

Subterranean formations are often made up of a series of relatively thin beds having different lithologic characteristics and, therefore different resistivities. In well logging systems the distances between the electrodes or antennas are great enough that the volume involved in a measurement may include several such thin beds. When individual layers are neither delineated nor resolved by a logging tool, the tool responds to the formation as if it were a macroscopically anisotropic formation. A thinly laminated sand/shale sequence is a particularly important example of a macroscopically anisotropic formation.

In situations where the borehole intersects the formations substantially perpendicular to the bedding planes, conventional induction and propagation well logging tools are sensitive almost exclusively to the horizontal components of the formation resistivity. When the borehole intersects the bedding planes at an angle, a so-called deviated borehole, the tool readings contain an influence from the vertical resistivity as well as the horizontal. This is particularly true when the angle between the borehole and the normal to the bedding planes becomes large, such as in directional or horizontal drilling where angles near 90° are commonly encountered. In these situations, the influence of vertical resistivity can cause discrepancies between measurements taken of the same formation in nearby vertical wells, thereby preventing useful comparison of these measurements. In addition, since reservoir evaluation is typically based upon data obtained from vertical wells, the use of data from wells drilled at high angles may produce erroneous estimates of formation producibility if proper account is not taken of the anisotropy effect.

A number of techniques exist for measuring formation anisotropy and/or vertical conductivity, such as by providing transmitter and/or receiver coils that are perpendicular to the borehole axis in addition to coils having conventional orientations.

Equipment and techniques that determine horizontal and vertical conductivity (or anisotropy) by employing special equipment dedicated specifically to such purpose result in increased equipment cost and increased logging time and/or cost.

The present invention is directed to overcoming, or at least minimizing, one or more of the problems set forth above by providing a new method for determining the anisotropic properties of subterranean formations. This method permits the use of a conventional induction type logging tool to determine such properties.

SUMMARY OF THE INVENTION

A new method is provided for determining the anisotropic properties of subterranean formations. In accordance with one aspect of the present invention, there is provided a first method of determining the horizontal resistivity, the vertical resistivity, and the anisotropy coefficient of a subterranean formation by means of an induction type logging tool positioned in a deviated borehole within the subterranean formation. In a preferred implementation, the induction type logging tool is first calibrated to determine a proportionality constant. A predetermined relationship between the proportionality constant, the phase shift derived resistivity, the attenuation derived resistivity, the horizontal resistivity, the vertical resistivity, and the anisotropy coefficient is then generated and stored in the memory of a programmed central processing unit. During an induction logging operation, the phase shift derived resistivity and attenuation derived resistivity are then received and processed by the programmed central processing unit in accordance with the predetermined relationship to generate the horizontal resistivity, the vertical resistivity, and the anisotropy coefficient.

In accordance with another aspect of the present invention, there is further provided an alternative method of determining the horizontal resistivity, the vertical resistivity, and the anisotropy coefficient of a subterranean formation by means of an induction type logging tool positioned in a deviated borehole within the subterranean formation. In a preferred implementation, in this alternative method, the induction type logging tool is again, preferably, first calibrated to determine a proportionality constant. The attenuation derived resistivity or the phase shift derived resistivity is then measured, and a single operating parameter is then varied. A predetermined relationship between the proportionality constant, the phase shift derived resistivity or the attenuation derived resistivity, the horizontal resistivity, the vertical resistivity, and the anisotropy coefficient is generated and stored in the memory of a programmed central processing unit. The phase shift derived resistivity or the attenuation derived resistivity measured initially is then measured again, and received and processed by the programmed central processing unit in accordance with the predetermined relationship to generate the horizontal resistivity, the vertical resistivity, and the anisotropy coefficient.

In accordance with still another aspect of the present invention, there is provided a method for determining the net/gross ratio and the sand layer resistivity for a subterranean formation consisting of a thinly laminated sand/shale sequence. In a first and a second preferred implementation, a predetermined relationship between the horizontal resistivity, the vertical resistivity, the net/gross ratio, and the ratio of the sand layer resistivity to the shale layer resistivity are generated and stored in the memory of the programmed central processing unit. In the first preferred implementation, the net/gross ratio and the ratio of the sand layer resistivity to the shale layer resistivity are then determined from the horizontal and vertical resistivities obtained by means of the preferred implementation of the first method for determining the horizontal and vertical resistivities. In the second preferred implementation, the net/gross ratio and the ratio of the sand layer resistivity to the shale layer resistivity are then determined from the horizontal and vertical resistivities obtained by means of the preferred implementation of the alternative method for determining the horizontal and vertical resistivities. In a final preferred implementation, the net/gross ratio and the ratio of the sand layer resistivity to the shale layer resistivity are determined directly from the phase shift derived and attenuation derived resistivities by means of a predetermined relationship between the phase shift derived resistivity, the attenuation derived resistivity, the net/gross ratio, and the ratio of the sand layer resistivity to the shale layer resistivity which is generated and stored in the memory of the programmed central processing unit following an initial calibration of the induction type logging tool. A separate measurement of the shale layer resistivity then permits a determination of the sand layer resistivity from the ratio of the sand layer resistivity to the shale layer resistivity determined by means of the preferred implementations.

In accordance with a final aspect of the present invention, there is provided a method for determining the net/gross ratio and the sand layer resistivity for a subterranean formation consisting of a thinly laminated sand/shale sequence including a microscopically anisotropic shale layer. The horizontal shale layer resistivity, vertical shale layer resistivity, and the shale layer anisotropy coefficient are first determined by means of the either the preferred implementation of the first method for determining the horizontal and vertical resistivities or the preferred implementation of the alternative method for determining the horizontal and resistivities. In a first and a second preferred implementation, a predetermined relationship between the horizontal resistivity, the vertical resistivity, the net/gross ratio, the ratio of the sand layer resistivity to the horizontal shale layer resistivity (or the vertical shale layer resistivity), and the shale layer anisotropy coefficient are generated and stored in the memory of the programmed central processing unit. In the first preferred implementation, the net/gross ratio and the ratio of the sand layer resistivity to the horizontal shale layer resistivity (or the vertical shale layer resistivity) are then determined from the horizontal and vertical resistivities for the subterranean formation obtained by means of the preferred implementation of the first method for determining the horizontal and vertical resistivities. In the second preferred implementation, the net/gross ratio and the ratio of the sand layer resistivity to the horizontal shale layer resistivity (or the vertical shale layer resistivity) are then determined from the horizontal and vertical resistivities for the subterranean formation obtained by means of the preferred implementation of the alternative method for determining the horizontal and vertical resistivities. In a final preferred implementation, the net/gross ratio and the ratio of the sand layer resistivity to the horizontal shale layer resistivity (or the vertical shale layer resistivity) are then determined directly from the phase shift derived and the attenuation derived resistivities for the subterranean formation by means of a predetermined relationship between the phase shift derived resistivity, the attenuation derived resistivity, the net/gross ratio, the ratio of the sand layer resistivity to the horizontal shale layer resistivity (or the vertical shale layer resistivity), and the shale layer anisotropy coefficient which is generated and stored in the memory of the programmed central processing unit following an initial calibration of the induction type logging tool. The separate measurement of the horizontal shale layer resistivity (or vertical shale layer resistivity) then permits a determination of the sand layer resistivity from the ratio of the sand layer resistivity to the horizontal shale layer resistivity (or the vertical shale layer resistivity).

BRIEF DESCRIPTION OF THE DRAWINGS

The present invention will become more fully understood from the following detailed description of the preferred embodiments, taken in conjunction with the accompanying drawings in which.

DETAILED DESCRIPTION OF PREFERRED EMBODIMENTS

Figure 1:
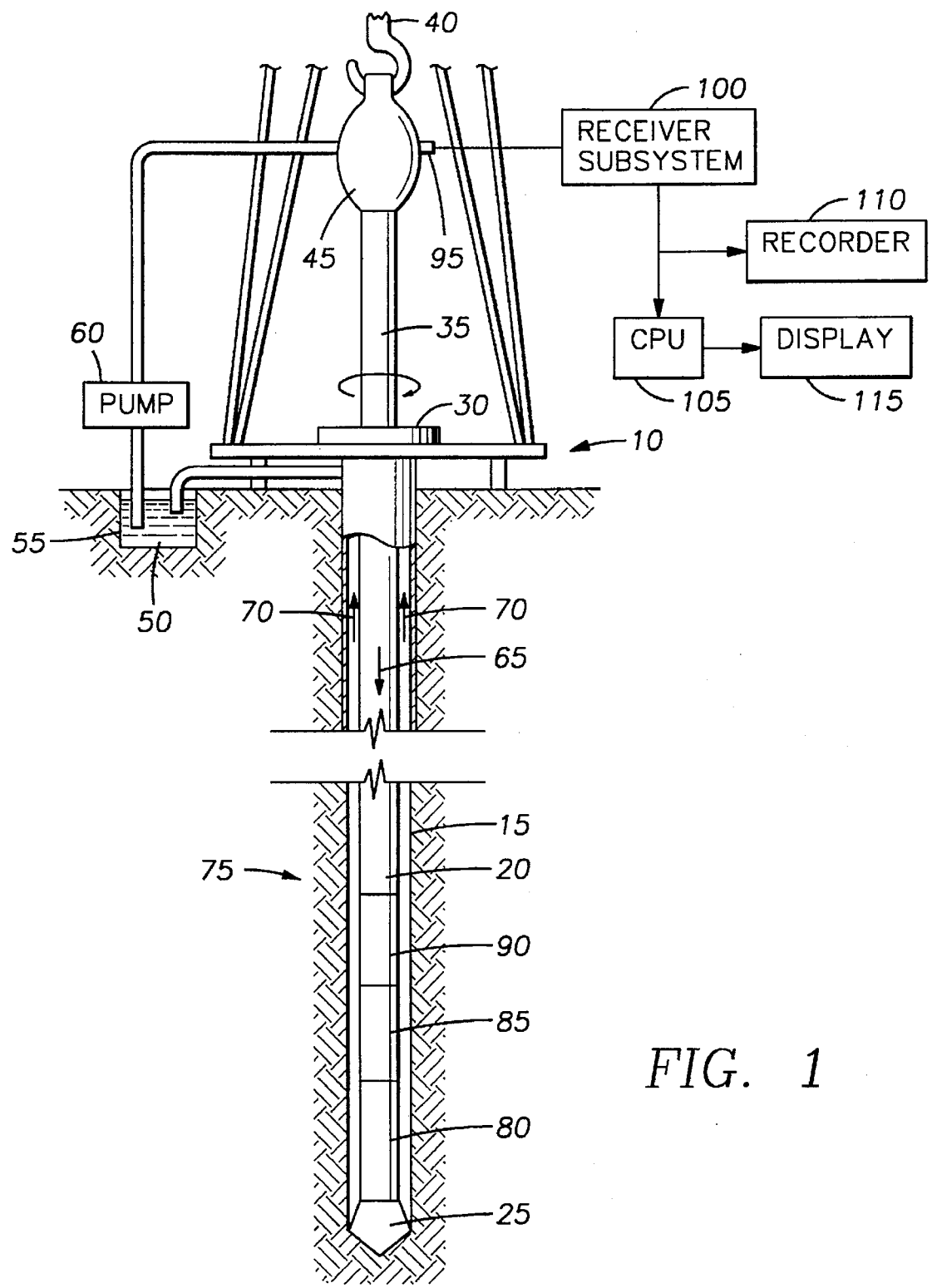
FIG. 1 is a schematic illustration of the present invention in conjunction with a logging while drilling apparatus.

Turning now to the drawings and referring initially to FIG. 1, an embodiment of the present invention in conjunction with a logging-while-drilling (LWD) apparatus will now be described. A platform and derrick 10 are positioned over a deviated borehole 15 that is formed in the earth by rotary drilling (or equivalently a vertical borehole intersecting a dipping bed). A drill string 20 is suspended within the deviated borehole 15 and includes a drill bit 25 at its lower end. The drill string 20 and a drill bit 25 are rotated by a rotating table 30 which engages a kelly 35 at the upper end of the drill string 20. The drill string 20 is suspended from a hook 40 attached to a traveling block (not shown). The kelly 35 is connected to the hook 40 through a rotary swivel 45 which permits rotation of the drill string 20 relative to the hook 40. Alternatively, the drill string 20 and drill bit 25 may be rotated from the surface by a "top drive" type of drilling rig.

Drilling mud 50 is contained in a pit 55 in the earth. A pump 60 pumps the drilling mud 50 into the drill string 20 via a port in the swivel 45 to flow downward through the center of the drill string 20, as indicated by the flow arrow 65. The drilling mud 50 exits the drill string 20 via ports in the drill bit 25 and then circulates upward in the region between the outside of the drill string 20 and the periphery of the deviated borehole 15, as indicated by the flow arrows 70. The drilling mud 50 thereby lubricates the bit 25 and carries formation cuttings to the surface of the earth. The drilling mud 50 is returned to the pit 55 for recirculation.

Mounted in conjunction with the drill bit 25 is a bottom hole assembly 75 that includes a directional drilling assembly 80 with a mud motor having a bent housing or an offset sub. Mounted above the directional drilling assembly 80 is an induction type logging tool 85. A measurement and communications subassembly 90 is also provided and includes means, known in the art, for measuring and computing the direction and inclination of the bottom hole assembly 75. The communications subassembly 90 may typically be a mud pulse telemetry system that includes a downhole transmitter for sending coded information, including measurement signals, uphole and surface instrumentation for detecting and decoding the information. One type of mud pulse telemetry system has an acoustic transmitter which employs a device known as a "mud siren" which includes a slotted stator and a slotted rotor that rotates and repeatedly interrupts the flow of drilling fluid to establish a desired acoustic wave signal in the drilling mud 50. Driving electronics in the communications subassembly 90 may typically include a suitable modulator, such as a phase shift keying (PSK) modulator, which conventionally produces driving signals for application to the mud transmitter. These driving signals can be used to apply appropriate modulation to the mud siren. The generated acoustic mud wave travels upward in the fluid through the center of the drill string at the speed of sound in the drilling mud 50. The acoustic wave is received at the surface of the earth by transducers 95. The transducers 95, which are, for example, piezoelectric transducers, convert the received acoustic signals to electronic signals. The output of the transducers 95 is coupled to the uphole receiving subsystem 100 that is operative to demodulate the transmitted signals, which can then be communicated to a programmed central processing unit (CPU) 105 and a recorder 110. The CPU 105 further communicates with a display unit 115. The programmed CPU 105 can be of any suitable type, for example a digital microprocessor, with associated memory, timing, input/output, and display driver functions.

Figure 2:
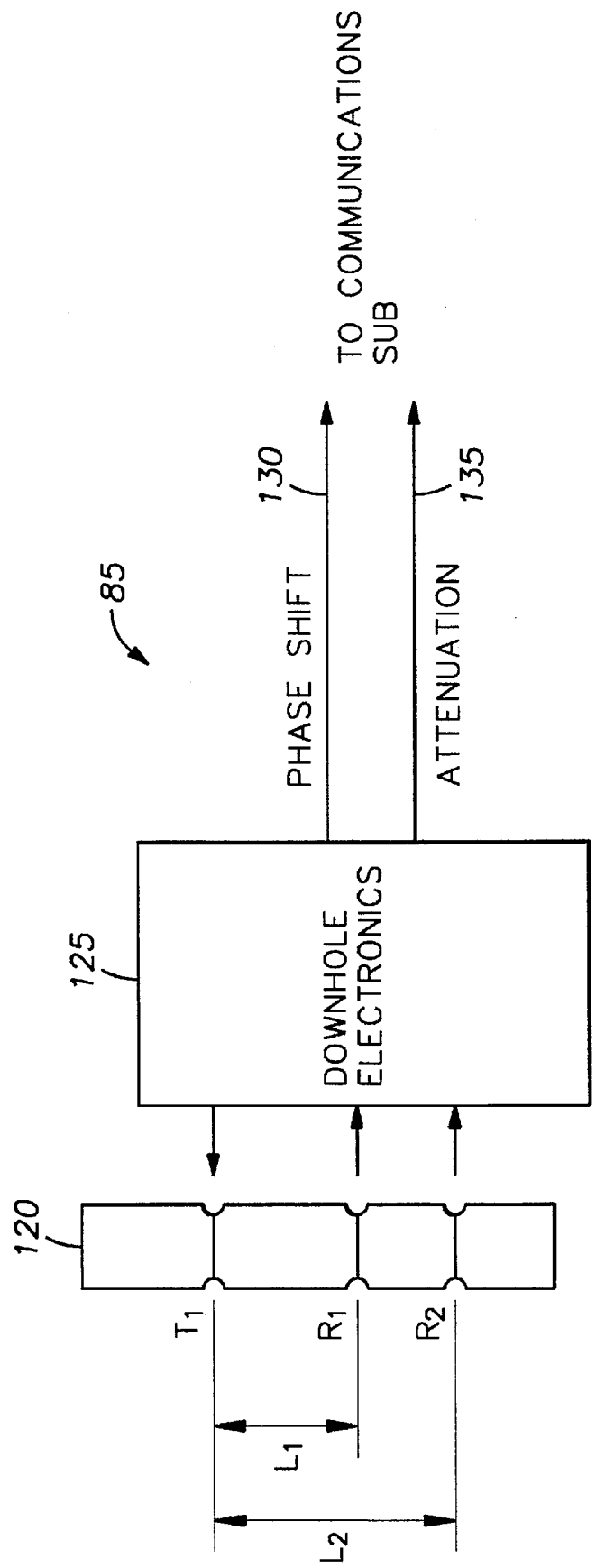
FIG. 2 is a schematic illustration of an induction type logging tool used in conjunction with the present invention.

Referring now to FIG. 2, the induction type logging tool 85 will now be described. The induction type logging tool 85, which is a conventional induction type logging tool, includes a transmitting antenna $T_1$, and a pair of receiving antennas $R_1$ and $R_2$ mounted on a section of a drill collar 120. The first receiving antenna $R_1$ is spaced from the transmitting antenna $T_1$ by a distance $L_1$, and the second receiving antenna $R_2$ is spaced apart from the transmitting antenna $T_1$ by a distance $L_2$. The antennas are coils supported in insulating media in recesses in the drill collar 120. The downhole electronics 125, typically contained in the drill collar 120, include means for energizing the transmitting antenna T with a signal having a frequency in the range from 0.1 MHz to 10 MHz, and typically about 2 MHz. An electromagnetic field produced by the transmitting coil $T_1$ induces eddy currents which flow in the conductive subterranean formation in loops centered on the axis of the deviated borehole 15. The eddy currents generate secondary electromagnetic fields which induce voltages in the receiver coils $R_1$ and $R_2$. The induced voltages, $V_1$ and $V_2$, at the receiver pair are then measured, in a well known manner, in a so-called differential receiver arrangement, to obtain a phase shift signal ($\Phi$) 130 representative of a phase shift between the electric potentials of the receiver pair, and an attenuation signal (A) 135 representative of an attenuation between the electric potentials of the receiver pair. These signals are then communicated to the communications subassembly 90 for transmission to the surface of the earth, where they are received by the programmed CPU 105 for further processing.

While the induction type logging tool 85 may include additional transmitters and receivers, as is well known in the art, to provide improved radial focusing of the induction type logging tool 85, they are not necessary for the determination of the anisotropic properties of a subterranean formation. The use of a single transmitter $T_1$ and a pair of receivers $R_1$ and $R_2$ will permit the determination of the anisotropic properties of a subterranean formation. In a preferred embodiment, the induction type logging tool 85 will be a Compensated Wave Resistivity (CWR) induction type logging tool, utilizing a single transmitter, and a pair of receivers, with multiple transmitter-receiver spacings, as available from Halliburton Energy Services Inc. of Houston, Tex.

The programmed CPU 105 then processes, in a well known manner by means of a lookup table stored in random access memory, the phase shift signal ($\Phi$) 130 and the attenuation signal (A) 135 to generate a phase shift derived resistivity signal $R_\Phi$ representative of a phase shift derived resistivity and an attenuation derived resistivity signal $R_A$ representative of an attenuation derived resistivity, respectively.

In an alternative embodiment, the programmed CPU 105 and associated memory, timing, and input/output functions may be positioned downhole, within the induction logging tool 85 itself, in a well known manner. In this alternative embodiment, the processed signals and resulting computational results are stored in the memory of the programmed CPU 105 for later retrieval at the surface location.

Figure 3:
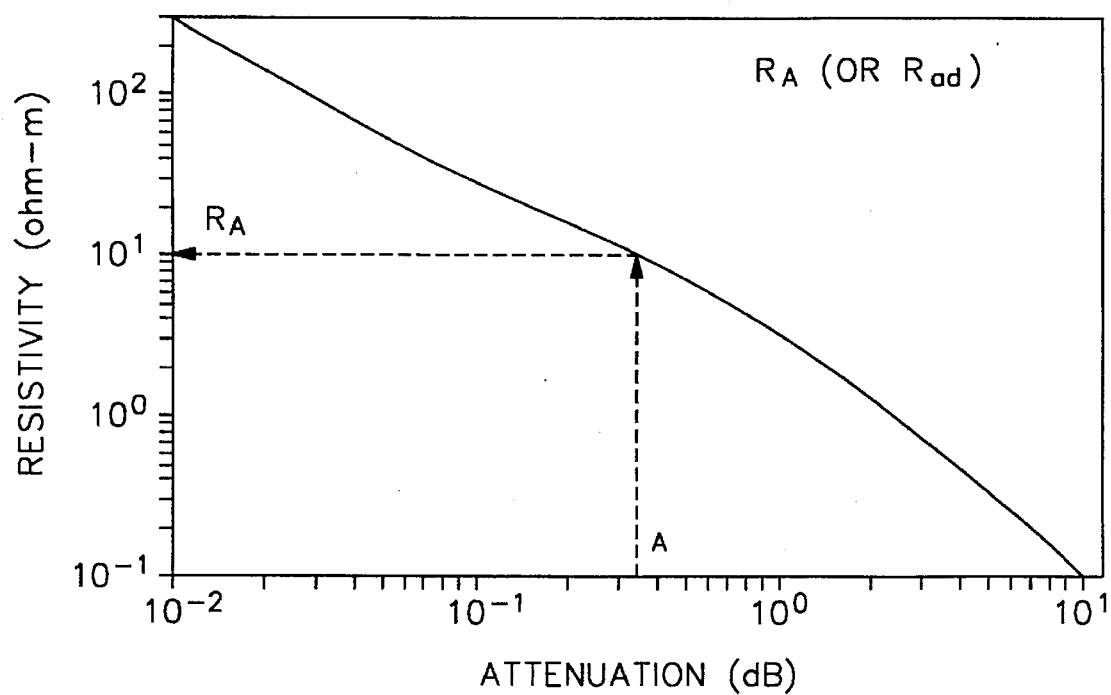
FIG. 3 is a graphical illustration of a typical relationship between an attenuation signal and an attenuation derived resistivity signal.
Figure 4:
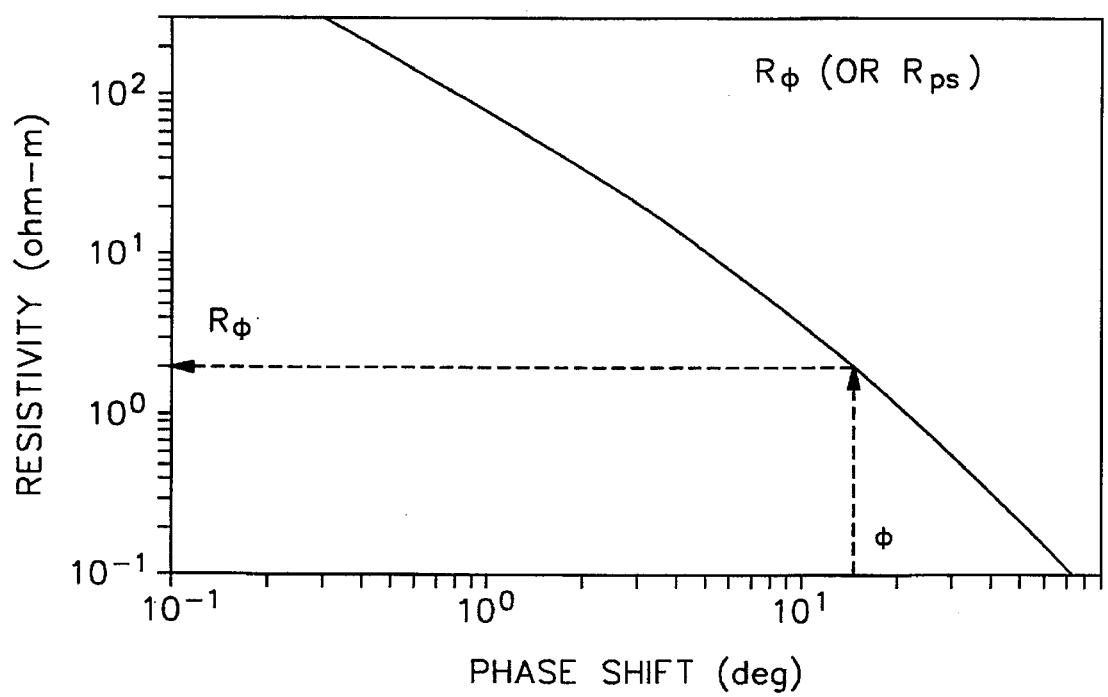
FIG. 4 is a graphical illustration of a typical relationship between a phase shift signal and a phase shift derived resistivity signal.

FIG. 3 represents a typical exemplary relationship between the attenuation signal (A) 135 and the attenuation derived resistivity signal $R_A$, while FIG. 4 represents a typical exemplary relationship between the phase shift signal ($\Phi$) 130 and the phase shift derived resistivity signal $R_\Phi$. The illustrated exemplary relationships are for an embodiment with the receivers, $R_1$ and $R_2$, mounted on a 6.75 inch diameter drill collar, with receiver spacings of 20 and 30 inches, and a transmitter frequency of 2 MHz.

For the induction type logging tool 85, operating at frequencies above approximately 0.1 MHz, the voltage V induced in the receivers $R_1$ and $R_2$ is given by the following relationship:

$$V = \frac{i\tau}{L^3} (-2e^{ikL}(1-ikL) + ikL(e^{ikL\beta} - e^{ikL})). \quad (2)$$

$$\text{Where } \beta = \sqrt{\cos^2\Theta + \alpha^2 \sin^2\Theta} \;\; ; \text{ and} \quad (3)$$

$$k^2 = \omega^2 \mu (\epsilon_h + i\sigma_h/\omega). \quad (4)$$

Where:

$\tau$ represents a proportionality constant which is dependent upon the induction type logging tool 85 and is a function of the loop antenna radii and the operating frequency $\omega$ and is determined during an initial calibration of the induction type logging tool 85 in a known manner;

L represents the spacing utilized between the transmitters and receivers utilized in the induction type logging tool 85;

k represents the wave number;

$\mu$ represents the magnetic permeability for the subterranean formation;

$\theta$ represents the deviation of the deviated borehole 15 from the subterranean formation normal direction (which would be present for a deviated borehole or a dipping bed);

$\alpha$ represents the anisotropy constant for the subterranean formation;

$\omega$ represents the operating frequency of the induction type logging tool 85;

$\sigma_h$ represents the horizontal conductivity for the subterranean formation; and $\epsilon_h$ represents the horizontal dielectric constant for the subterranean formation.

The operating variables $\omega$, $L_1$, $L_2$, and $\theta$ can all be varied during a logging operation, with a variation in the deviation angle $\theta$ requiring two boreholes in the same formation. In a preferred embodiment, the operating frequency $\omega$ ranges from approximately 400 KHz to 2 MHz, the transmitter-receiver spacing $L_1$ ranges from approximately 10" to 50", the transmitter spacing $L_2$ ranges from approximately 20" to 60", and the deviation angle $\theta$ ranges from approximately 0° to 90°.

Figure 5:
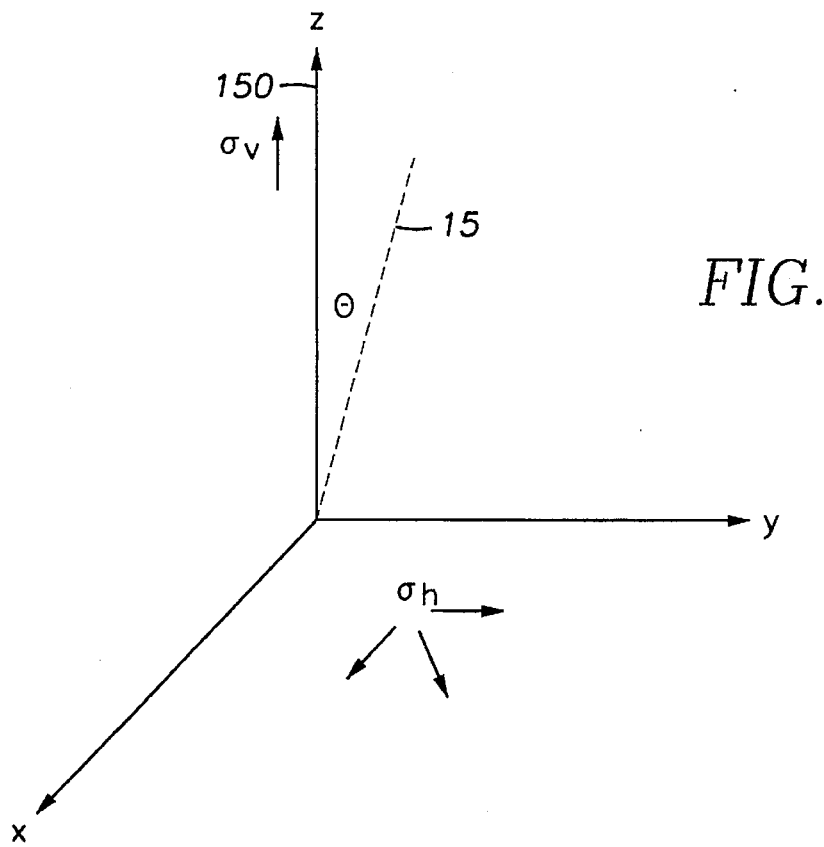
FIG. 5 is an illustration of the geometrical relationship between the horizontal and vertical resistivities.

FIG. 5 illustrates the geometrical relationship between the orientation of the borehole 15 and the normal 150 of the subterranean formation.

The phase shift signal ($\Phi$) 130 and the attenuation signal (A) 135 are then obtained for the induction type logging tool 85 by the following relationship:

$$A = \frac{\sqrt{V_{2,re}^2 + V_{2,im}^2}}{\sqrt{V_{1,re}^2 + V_{1,im}^2}} \text{ and } \Phi = \arctan\frac{V_{2,im}}{V_{2,re}} - \arctan\frac{V_{2,im}}{V_{1,re}}. \quad (5)$$

Where $V_1$, the voltage induced in the receiver $R_1$, consists of real and imaginary parts, $V_{1,re}$ and $V_{1,im}$, and $V_2$, the voltage induced in the receiver $R_2$, consists of real and imaginary parts, $V_{2,re}$ and $V_{2,im}$.

The relationships expressed in equations (2), (3), and (4) above for the induced voltage V, lead to the following observations. First, since the wave number k is a complex number, induction type logging tool responses are characterized by two measurements: phase and attenuation. Consequently, the effect of anisotropy shows up differently on each measurement. Secondly, the effect of anisotropy depends on the magnitude of kL (the product of the wave number and transmitter-receiver spacing) explicitly. Therefore, the effect of anisotropy shows up differently for different transmitter-receiver coil spacings. Thirdly, with identical transmitter-receiver coil spacings, the anisotropy effect is different for different operating frequencies. Finally, with identical transmitter-receiver coil spacings, and for identical operating frequencies, the effect of anisotropy shows up differently for different deviation angles $\theta$.

The phase shift derived and attenuation derived resistivities should be identical in a thick, homogeneous, and isotropic formation. They will however be different in formations including shoulder beds, formations with fluid invasion, formations that are highly resistive and highly dielectric. They will also differ in a homogeneous but anisotropic formation.

Figure 6:
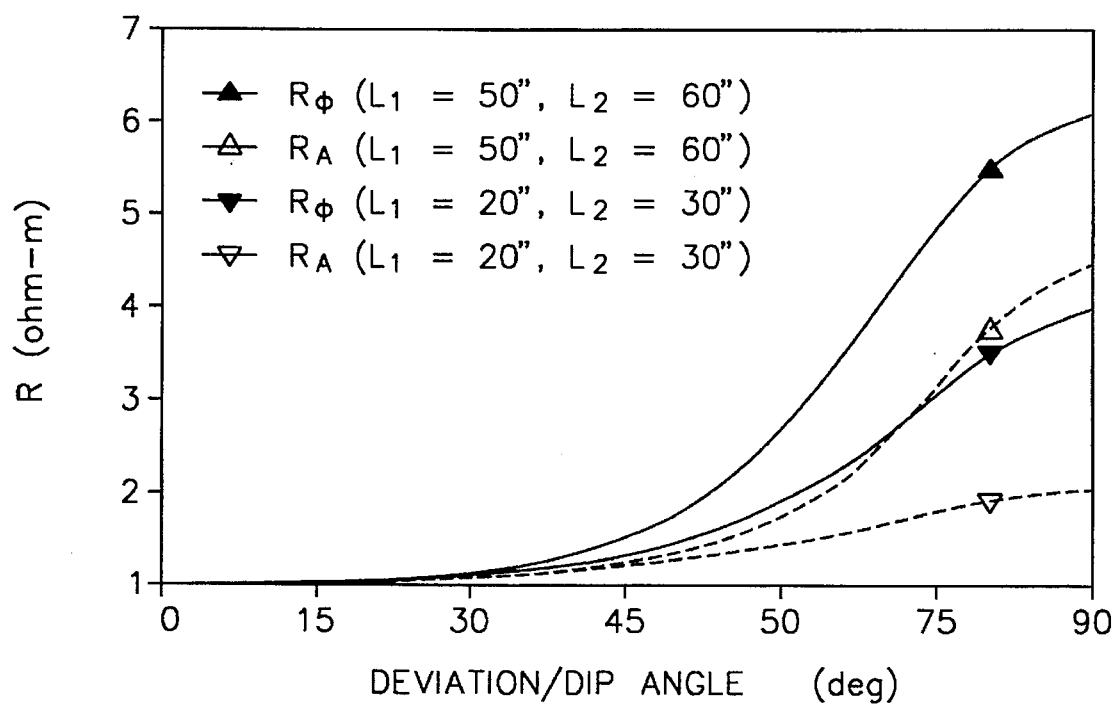
FIG. 6 is a graphical illustration of the effect of anisotropy, as a function of the deviation angle $\theta$ and the transmitter-receiver spacings, for a 2 MHz LWD induction type logging tool in a deviated borehole for an anisotropic formation.

FIG. 6 illustrates the effect of anisotropy, as a function of the deviation angle $\theta$ and the transmitter-receiver spacing, on the phase shift derived resistivity $R_\Phi$ and the attenuation derived resistivity $R_A$ for a 2 MHz LWD induction type logging tool, in a deviated borehole for an anisotropic formation with anisotropy $\alpha^2 = 1/4$, resulting in a 1 ohm-m horizontal resistivity $R_h$ and a 4 ohm-m vertical resistivity $R_v$. At high deviation angles $\theta$, the phase shift derived resistivity $R_\Phi$ for each of the transmitter-receiver spacings is much higher than the corresponding attenuation derived resistivity $R_A$; and the phase shift derived resistivity $R_\Phi$ and attenuation derived resistivity $R_A$ for different transmitter-receiver spacings also differ significantly.

The difference between the phase shift derived resistivity $R_\Phi$ and the attenuation derived resistivity $R_A$ the difference between phase shift derived resistivities $R_\Phi$ and attenuation derived resistivities $R_A$ for different transmitter-receiver spacings; the difference between the phase shift derived resistivities R, and attenuation derived resistivities $R_A$ for different deviation angles $\theta$; and the difference between the phase shift derived resistivities $R_\Phi$ and attenuation derived resistivities $R_A$ for different operating frequencies $\omega$; can each be utilized by means of equations (2), (3), and (4) above to determine the formation anisotropy as illustrated in FIGS. 7-16. These figures graphically depict the interrelationships between specific operating parameters for different LWD tool configurations and the resulting anisotropic properties for subterranean formations.

Figure 7:
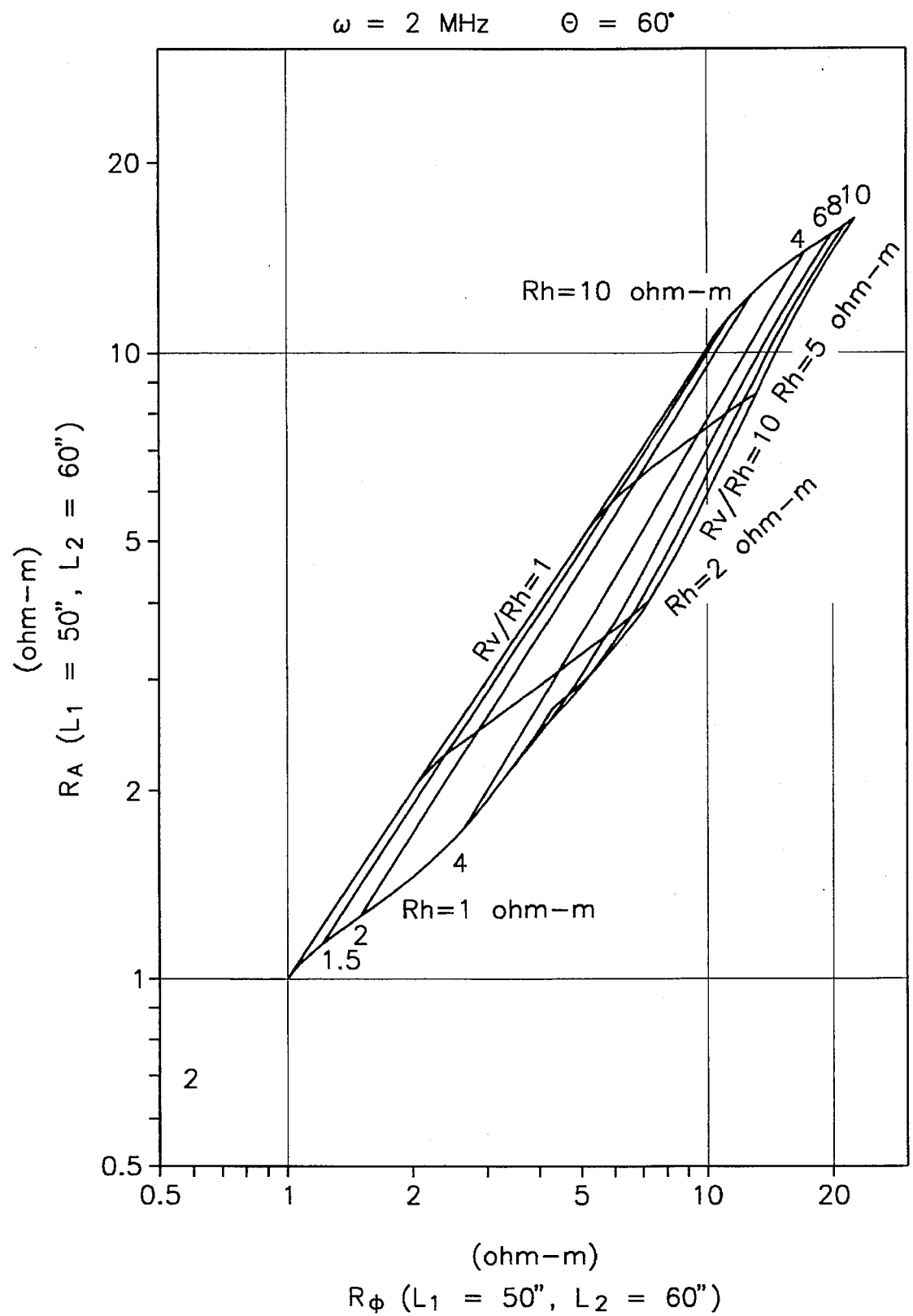
FIG. 7 is a graphical illustration of a typical exemplary relationship between the phase shift derived resistivity $R_\Phi$, the attenuation derived resistivity $R_A$, the horizontal resistivity $R_h$, and the anisotropy coefficient $\alpha$.

FIG. 7 illustrates a typical exemplary relationship between the phase shift derived resistivity $R_\Phi$, the attenuation derived resistivity $R_A$, the horizontal resistivity $R_h$, and the anisotropy coefficient $\lambda$ (which is $1/\alpha$) for a CWR induction type logging tool having a unique proportionality constant τ determined during an initial calibration, operating at a frequency of 2 MHz, at a deviation θ of 60°, with a transmitter-receiver spacing of $L_1=50"$ and $L_2=60"$.

Figure 8:
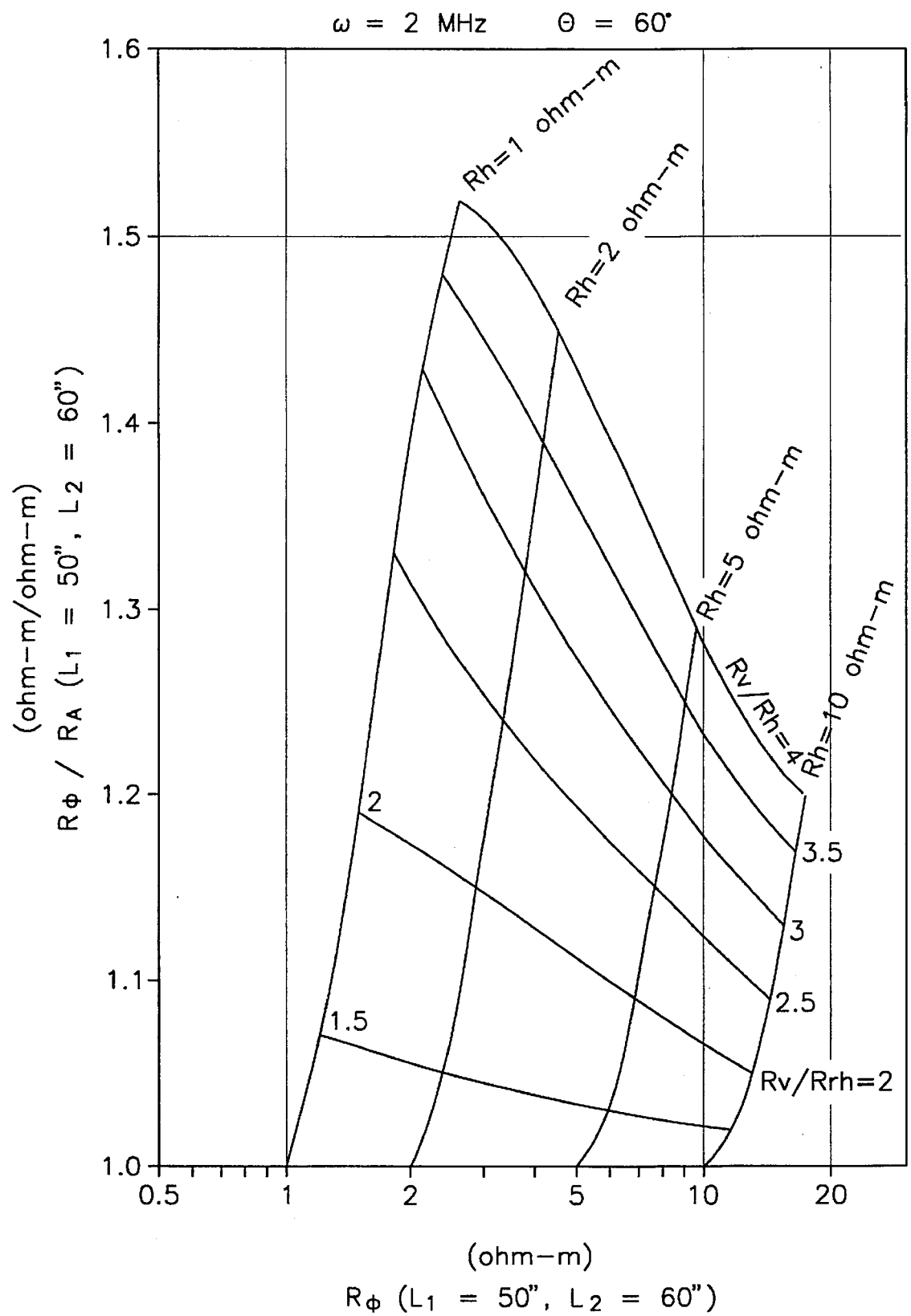
FIG. 8 is a graphical illustration of a typical exemplary relationship between the phase shift derived resistivity $R_\Phi$, the ratio of the phase shift derived resistivity $R_{101}$, and the attenuation derived resistivity $R_A$, the horizontal resistivity $R_h$, and the anisotropy coefficient $\alpha$.

FIG. 8 illustrates a typical exemplary relationship between the phase shift derived resistivity $R_\phi$, the ratio of the phase shift derived resistivity $R_\phi$ and the attenuation derived resistivity $R_A$, the horizontal resistivity $R_h$, and the anisotropy coefficient λ(which is 1/α) for a CWR induction type logging tool having a unique proportionality constant τ determined during an initial calibration, operating at a frequency of 2 MHz, at a deviation θ of 60°, with a transmitter-receiver spacing of $L_1=50"$ and $L_2=60"$.

The exemplary relationships illustrated in FIGS. 7 and 8 are generated by means of equations (2), (3), and (4) above using conventional computational algorithms. Similar relationships are generated and stored in the random access memory of the programmed CPU 105 and utilized, in the form of a lookup table, to determine the horizontal resistivity $R_h$, the vertical resistivity $R_v$, and the anisotropy coefficient α a for a subterranean formation as a function of the phase shift derived resistivity $R_\phi$ and the attenuation derived resistivity $R_A$ obtained at a given deviation θ, and for a particular induction type logging tool 85 having a proportionality constant τ determined during an initial calibration, at an operating frequency ω, with predetermined transmitter-receiver spacings $L_1$ and $L_2$.

Figure 9:
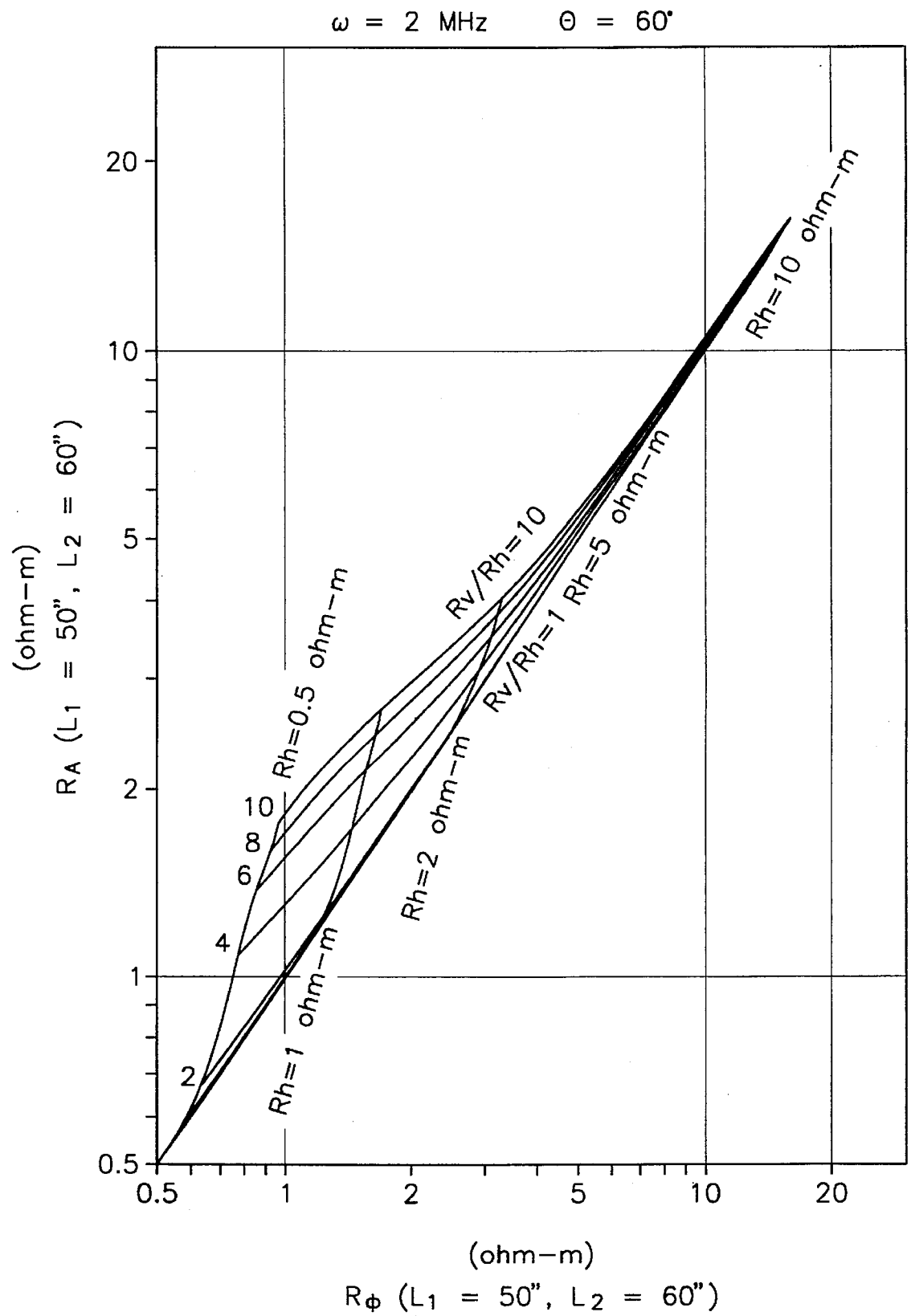
FIG. 9 is a graphical illustration of a typical exemplary relationship between the attenuation derived resistivity $R_A$ for a first set of transmitter-receiver spacings, the attenuation derived resistivity $R_A$ for a second set of transmitter-receiver spacings, the horizontal resistivity $R_h$, and the anisotropy coefficient $\alpha$.

FIG. 9 illustrates a typical exemplary relationship between the attenuation derived resistivity $R_A$ for a first transmitter-receiver spacing of $L_1=20"$ and $L_2=30"$, the attenuation derived resistivity $R_A$ for a second transmitter-receiver spacing of $L_1=50"$ and $L_2=60"$, the horizontal resistivity $R_h$, and the anisotropy coefficient λ; (which is 1/α) for a CWR induction type logging tool, which permits variable transmitter-receiver spacing, having a unique proportionality constant τ determined during an initial calibration, operating at a frequency of 2 MHz, at a deviation angle θ of 60°.

Figure 10:
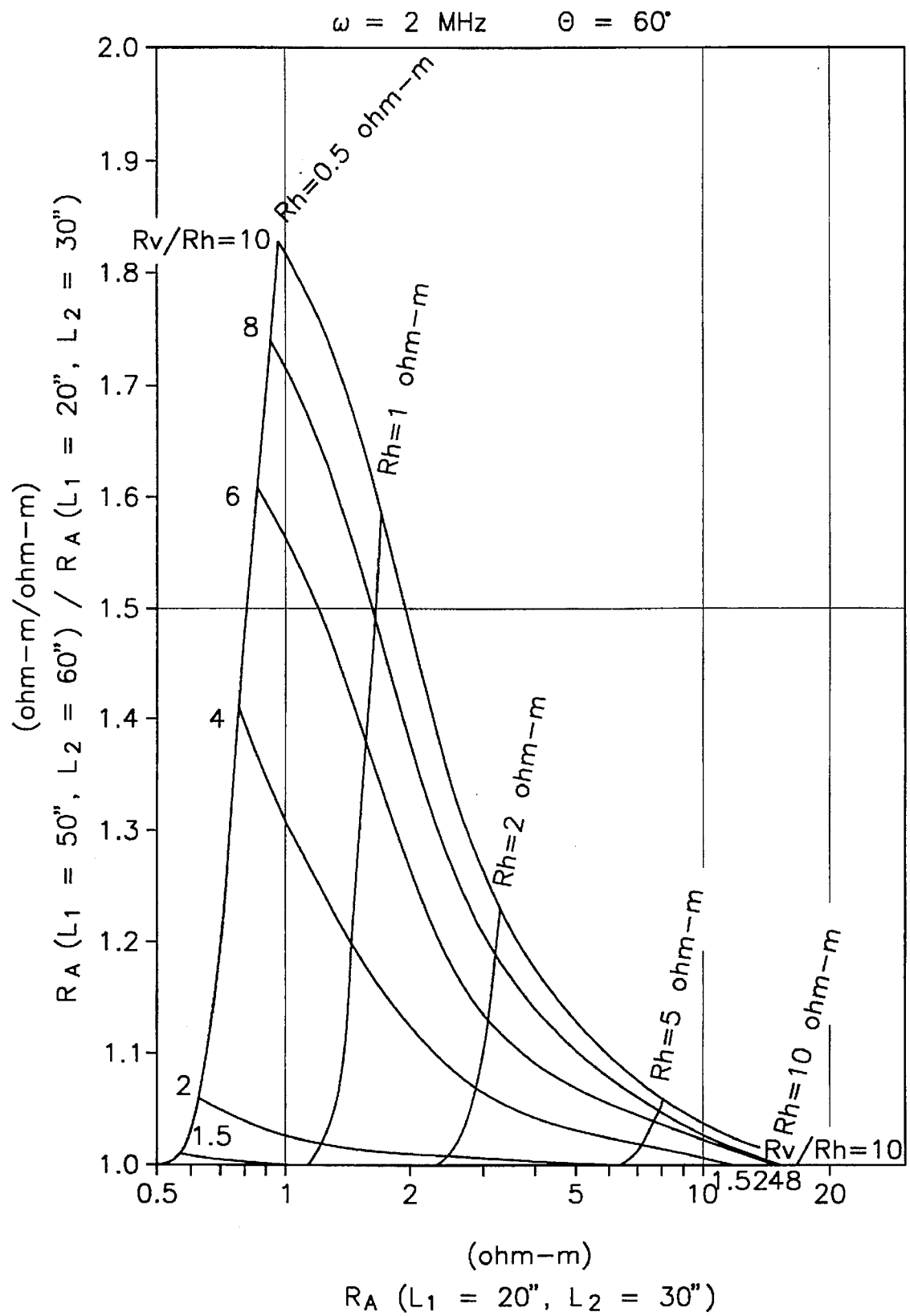
FIG. 10 is a graphical illustration of a typical exemplary relationship between the attenuation derived resistivity $R_A$ for a first set of transmitter-receiver spacings, the ratio of the attenuation derived resistivity $R_A$, for a second set of transmitter-receiver spacings to the attenuation derived resistivity $R_A$ for the first set of transmitter-receiver spacings, the horizontal resistivity $R_h$, and the anisotropy coefficient $\alpha$.

FIG. 10 illustrates a typical exemplary relationship between the attenuation derived resistivity $R_A$ for a first transmitter-receiver spacing of $L_1=20"$ and $L_2=30"$, the ratio of the attenuation derived resistivity $R_A$ for a second transmitter-receiver spacing of $L_1=50"$ and $L_2=60"$ to the attenuation derived resistivity $R_A$ for the first transmitter-receiver spacing of $L_1=20"$ and $L_2=30"$, the horizontal resistivity $R_h$ for a subterranean formation, and the anisotropy coefficient λ (which is 1/α) for a CWR induction type logging tool, which permits variable transmitter-receiver spacing, having a unique proportionality constant τ determined during an initial calibration, operating at a frequency of 2 MHz, at a deviation angle θ of 60°.

Figure 11:
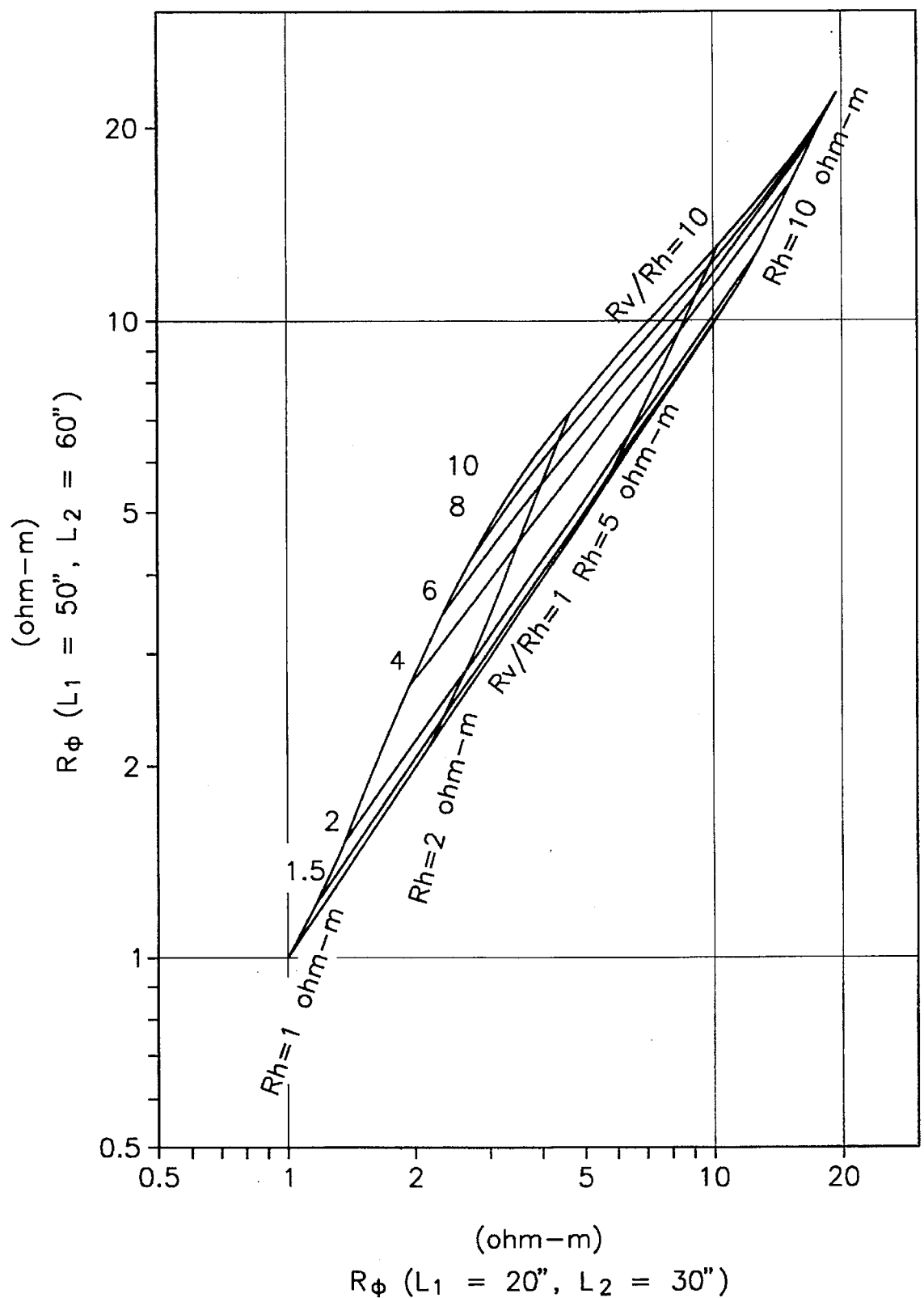
FIG. 11 is a graphical illustration of a typical exemplary relationship between the phase shift derived resistivity $R_\Phi$ for a first set of transmitter-receiver spacings, the phase shift derived resistivity $R_\Phi$ for a second set of transmitter-receiver spacings, the horizontal resistivity $R_h$, and the anisotropy coefficient $\alpha$.

FIG. 11 illustrates a typical exemplary relationship between the phase shift derived resistivity $R_\phi$ for a first transmitter-receiver spacing of $L_1=20"$ and $L_2=30"$, the phase shift derived resistivity $R_\phi$ for a second transmitter-receiver spacing of $L_1=50"$ and $L_2=60"$, the horizontal resistivity $R_h$ for a subterranean formation, and the anisotropy coefficient λ(which is 1/α) for a CWR induction type logging tool, which permits variable transmitter-receiver spacing, having a unique proportionality constant τ determined during an initial calibration, operating at a frequency of 2 MHz, at a deviation angle θ of 60°.

Figure 12:
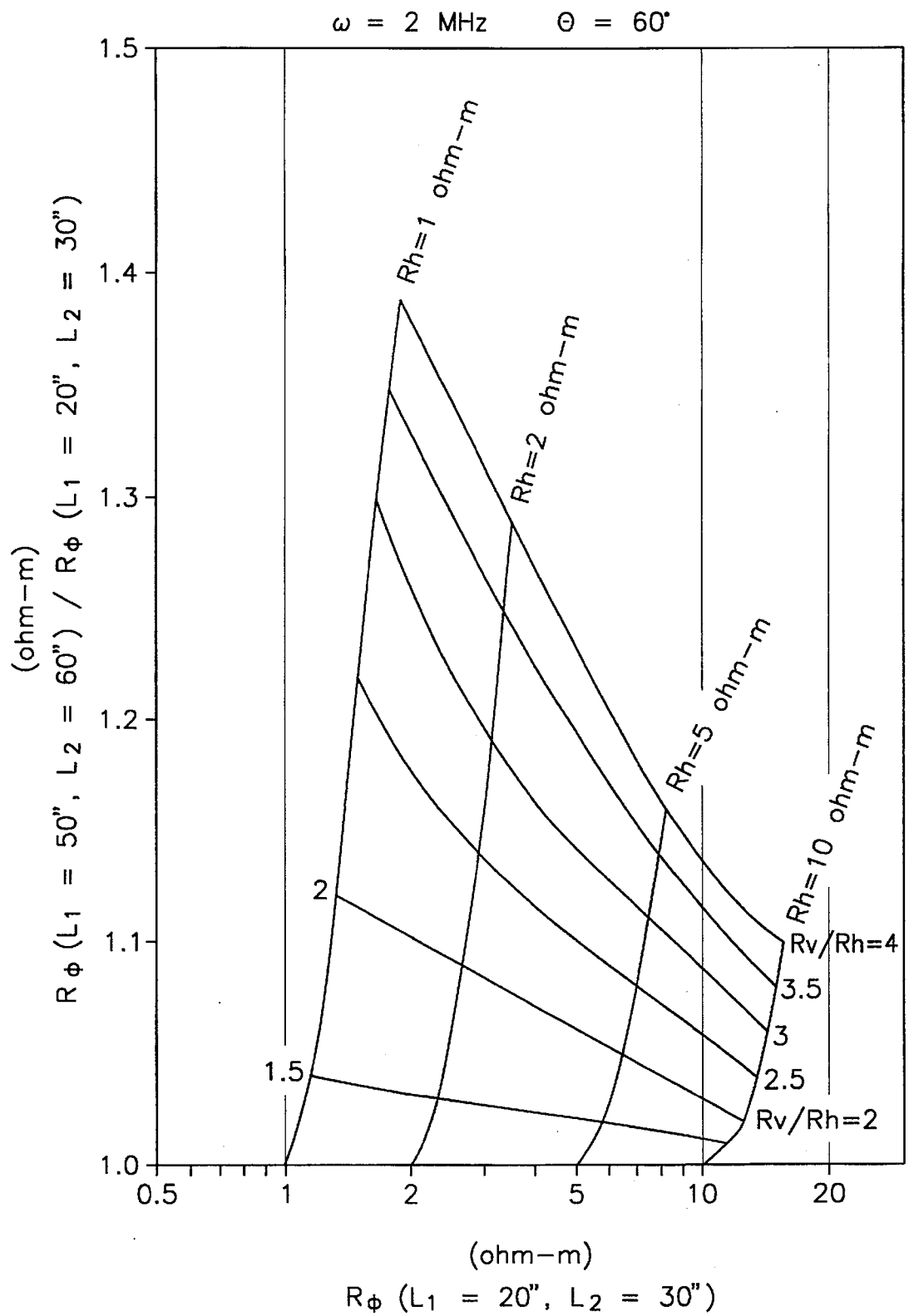
FIG. 12 is a graphical illustration of a typical exemplary relationship between the phase shift derived resistivity $R_\Phi$ for a first set of transmitter-receiver spacings, the ratio of the phase shift derived resistivity $R_\Phi$ for a second set of transmitter-receiver spacings to the phase shift derived resistivity $R_\Phi$ for the first set of transmitter-receiver spacings, the horizontal resistivity $R_h$, and the anisotropy coefficient $\alpha$.

FIG. 12 illustrates a typical exemplary relationship between the phase shift derived resistivity $R_\phi$ for a first transmitter-receiver spacing of $L_1=20"$ and $L_2=30"$, the ratio of the phase shift derived resistivity $R_\phi$ for a second transmitter-receiver spacing of $L_1=50"$ and $L_1=60"$ to the phase shift derived resistivity $R_\phi$ for the first transmitter-receiver spacing of $L_1=20"$ and $L_2=30"$, the horizontal resistivity $R_h$, and the anisotropy coefficient λ (which is 1/α) for a CWR induction type logging tool, which permits variable transmitter-receiver spacing, having a unique proportionality constant τ determined during an initial calibration, operating at a frequency of 2 MHz, at a deviation angle θ of 60°.

The exemplary relationships illustrated in FIGS. 9-12 are generated by means of equations (2), (3), and (4) above using conventional computational algorithms. Similar relationships are generated and stored in the random access memory of the programmed CPU 105 and utilized, in the form of a lookup table, to determine the horizontal resistivity $R_h$, the vertical resistivity $R_v$, and the anisotropy coefficient α for a subterranean formation as a function of the phase shift derived resistivity $R_\phi$ or the attenuation derived resistivity $R_A$ for two different transmitter-receiver spacings, for an operating frequency ω, obtained at a given deviation θ, and for a particular induction type logging tool 85 having a proportionality constant τ determined during an initial calibration.

In a preferred embodiment, each of the transmitter-receiver spacings, $L_1$ and $L_2$, are varied by at least approximately 20" between the repetitive measurements of the phase shift derived resistivity $R_\phi$ or the attenuation derived resistivity $R_A$. This degree of variation provides optimal computation of the relationship between the horizontal resistivity $R_h$, the vertical resistivity $R_v$, and the anisotropy coefficient α, and the phase shift derived resistivity $R_\phi$ or the attenuation derived resistivity $R_A$ for two different sets of transmitter-receiver spacings for conventional induction type logging tools.

Figure 13:
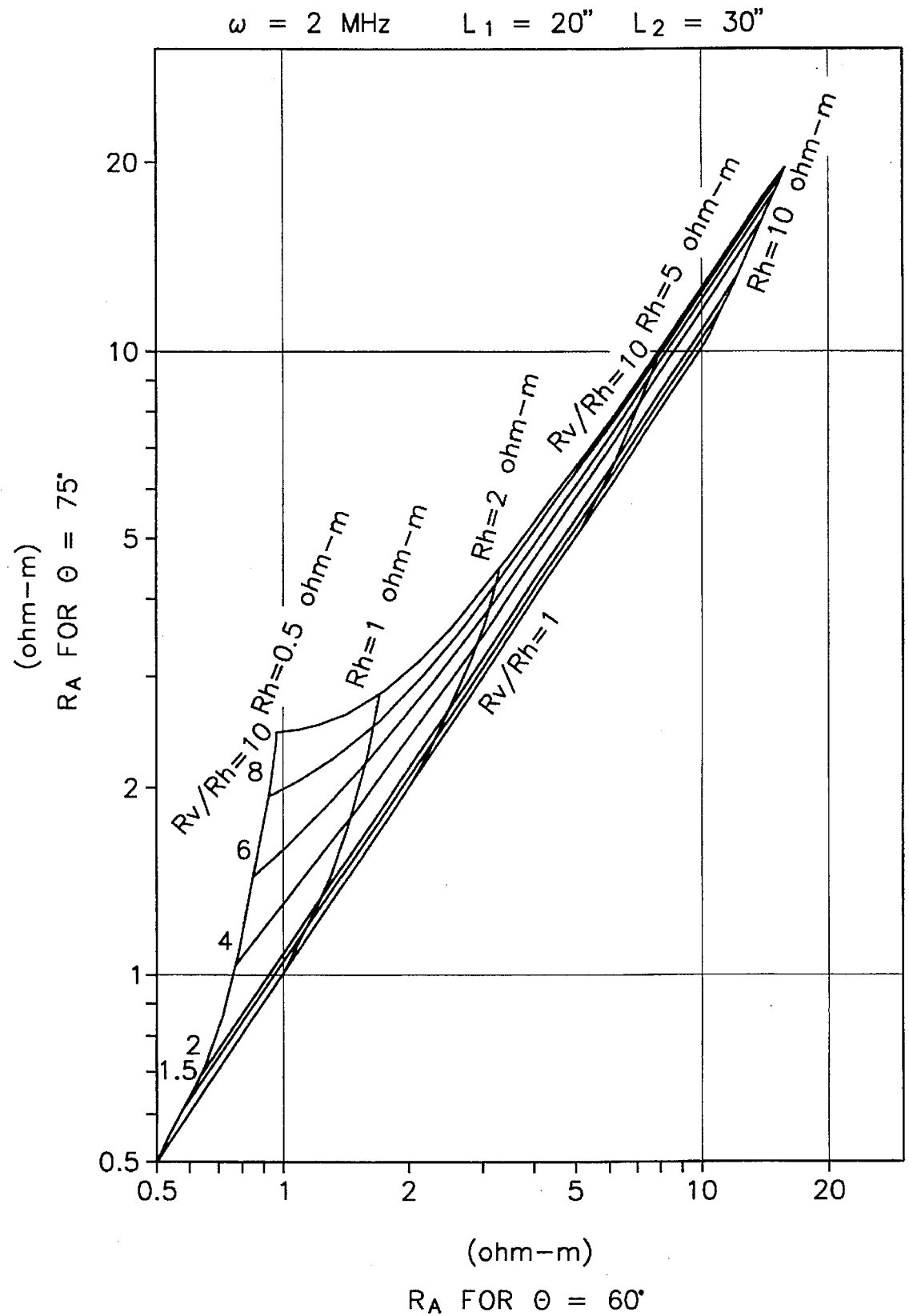
FIG. 13 is a graphical illustration of a typical exemplary relationship between the attenuation derived resistivity $R_A$ for a first deviation angle $\theta_1$, the attenuation derived resistivity $R_A$ for a second deviation angle $\theta_2$, the horizontal resistivity $R_h$, and the anisotropy coefficient $\alpha$.

FIG. 13 illustrates a typical exemplary relationship between the attenuation derived resistivity $R_A$ for a first deviation angle $\theta_1=60°$, the attenuation derived resistivity $R_A$ for a second deviation angle of $\theta_2 75°$, the horizontal resistivity $R_h$, and the anisotropy coefficient λ (which is 1/α) for a CWR induction type logging tool, having a unique proportionality constant τ determined during an initial calibration, operating at a frequency of 2 MHz, for a transmitter-receiver spacing of $L_1=20"$ and $L_2=30"$.

Figure 14:
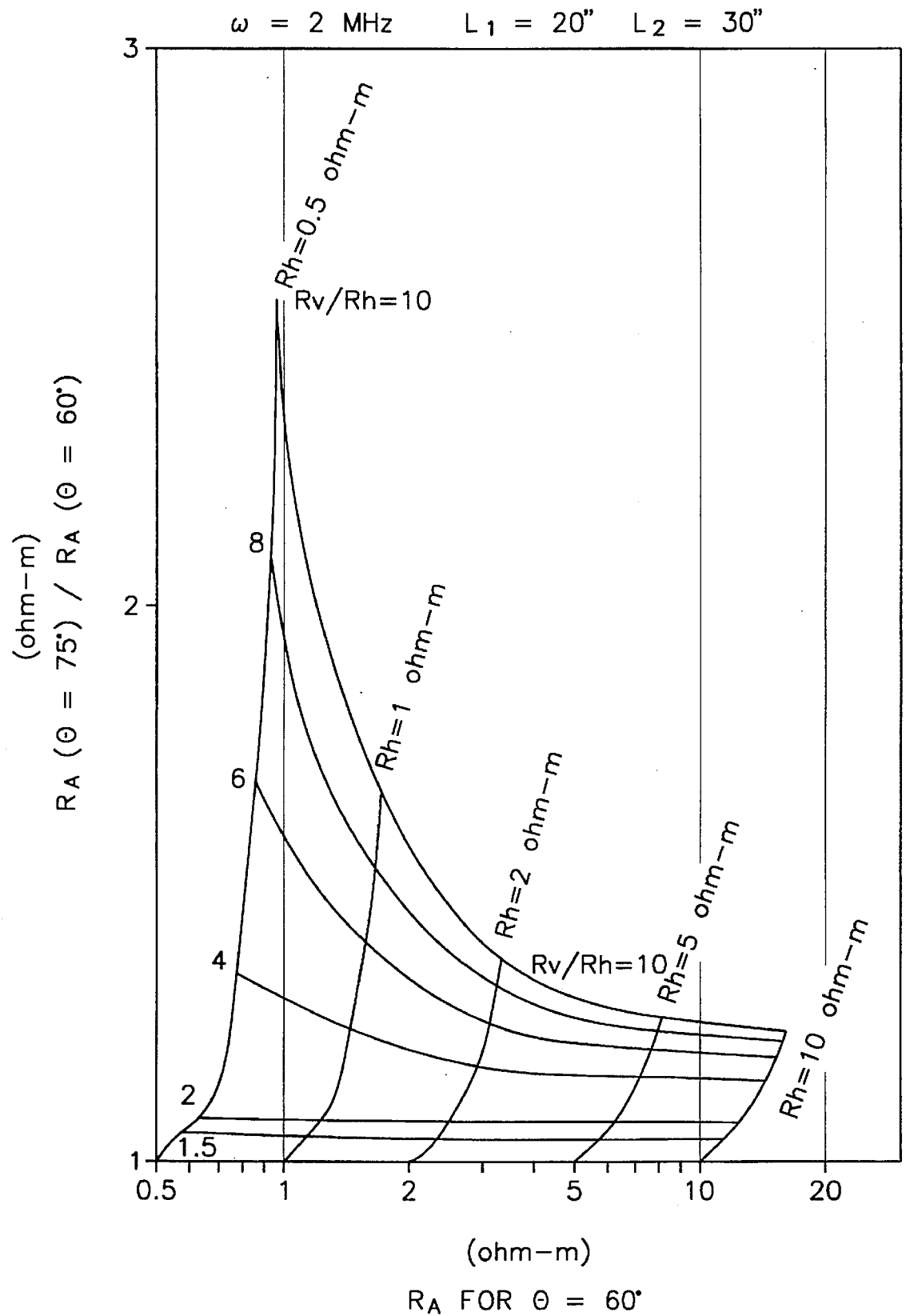
FIG. 14 is a graphical illustration of a typical exemplary relationship between the attenuation derived resistivity $R_A$ for a first deviation angle $\theta_1$, the ratio of the attenuation derived resistivity $R_A$ for a second deviation angle $\theta_2$ to the attenuation derived resistivity $R_A$ for a first deviation angle $\theta_1$, the horizontal resistivity $R_h$, and the anisotropy coefficient $\alpha$.

FIG. 14 illustrates a typical exemplary relationship between the attenuation derived resistivity $R_A$ for a first deviation angle of $\theta_1=60°$, the ratio of the attenuation derived resistivity $R_A$ for a second deviation angle $\theta_2=75°$ to the attenuation derived resistivity $R_A$ for a first deviation angle $\theta_1=60°$, the horizontal resistivity $R_h$ for a subterranean formation, and the anisotropy coefficient λ(which is 1/α) for a CWR induction type logging tool, having a unique proportionality constant τ determined during an initial calibration, operating at a frequency of 2 MHz, for a transmitter-receiver spacing of $L_1=20"$ and $L_2=30"$.

Figure 15:
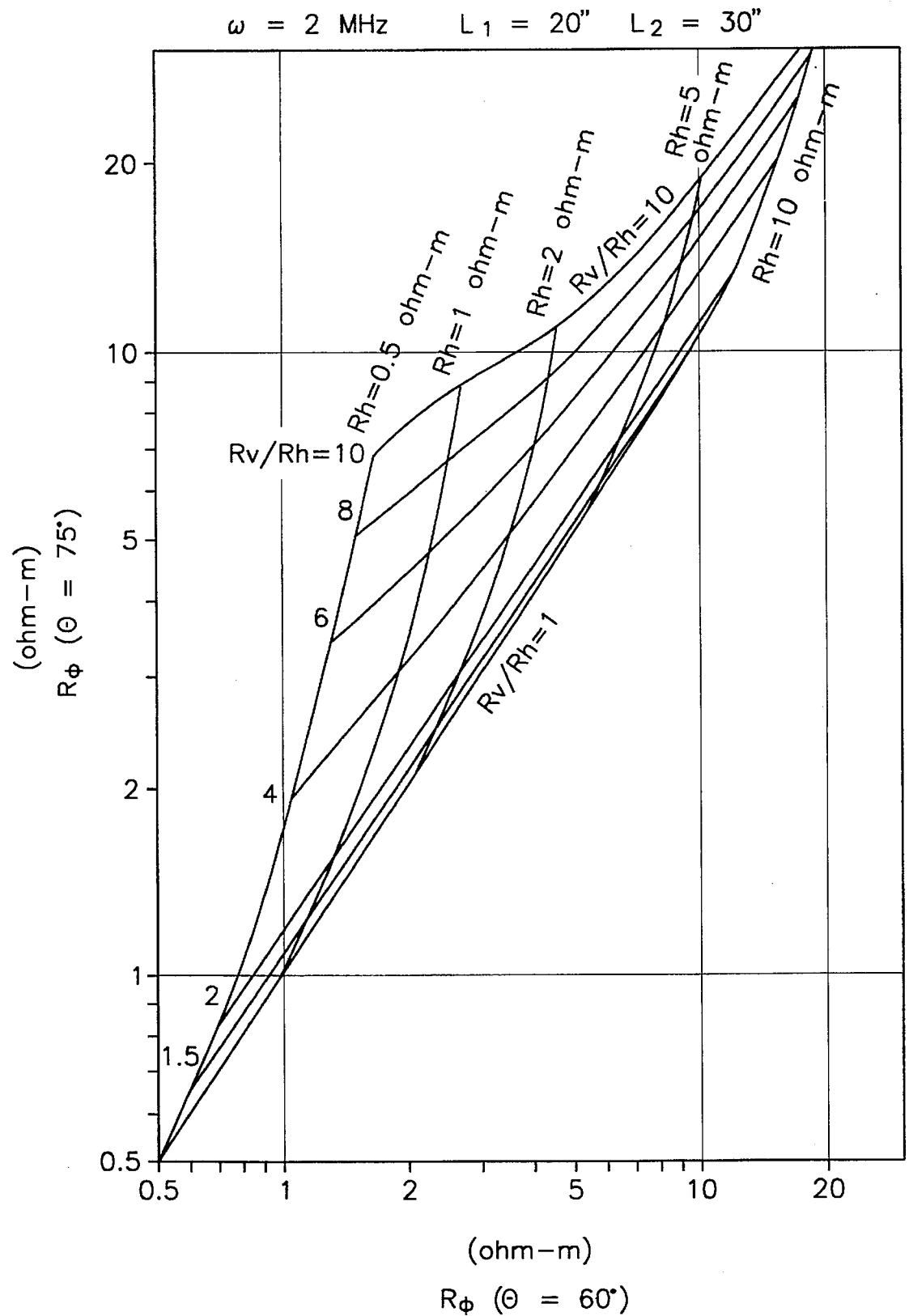
FIG. 15 is a graphical illustration of a typical exemplary relationship between the phase shift derived resistivity $R_\Phi$ for a first deviation angle $\theta_1$, the phase shift derived resistivity $R_\Phi$ for a second deviation angle $\theta_2$, the horizontal resistivity $R_h$, and the anisotropy coefficient $\alpha$.

FIG. 15 illustrates a typical exemplary relationship between the phase shift derived resistivity $R_\phi$ for a first deviation angle $\theta_1=60°$, the phase shift derived resistivity $R_\phi$ for a for a second deviation angle $\theta_2=75°$, the horizontal resistivity $R_h$ for a subterranean formation, and the anisotropy coefficient λ (which is 1/α) for a CWR induction type logging tool, having a unique proportionality constant τ determined during an initial calibration, operating at a frequency of 2 MHz, for transmitter receiver spacing of $L_1=20"$ and $L_2=30"$.

Figure 16:
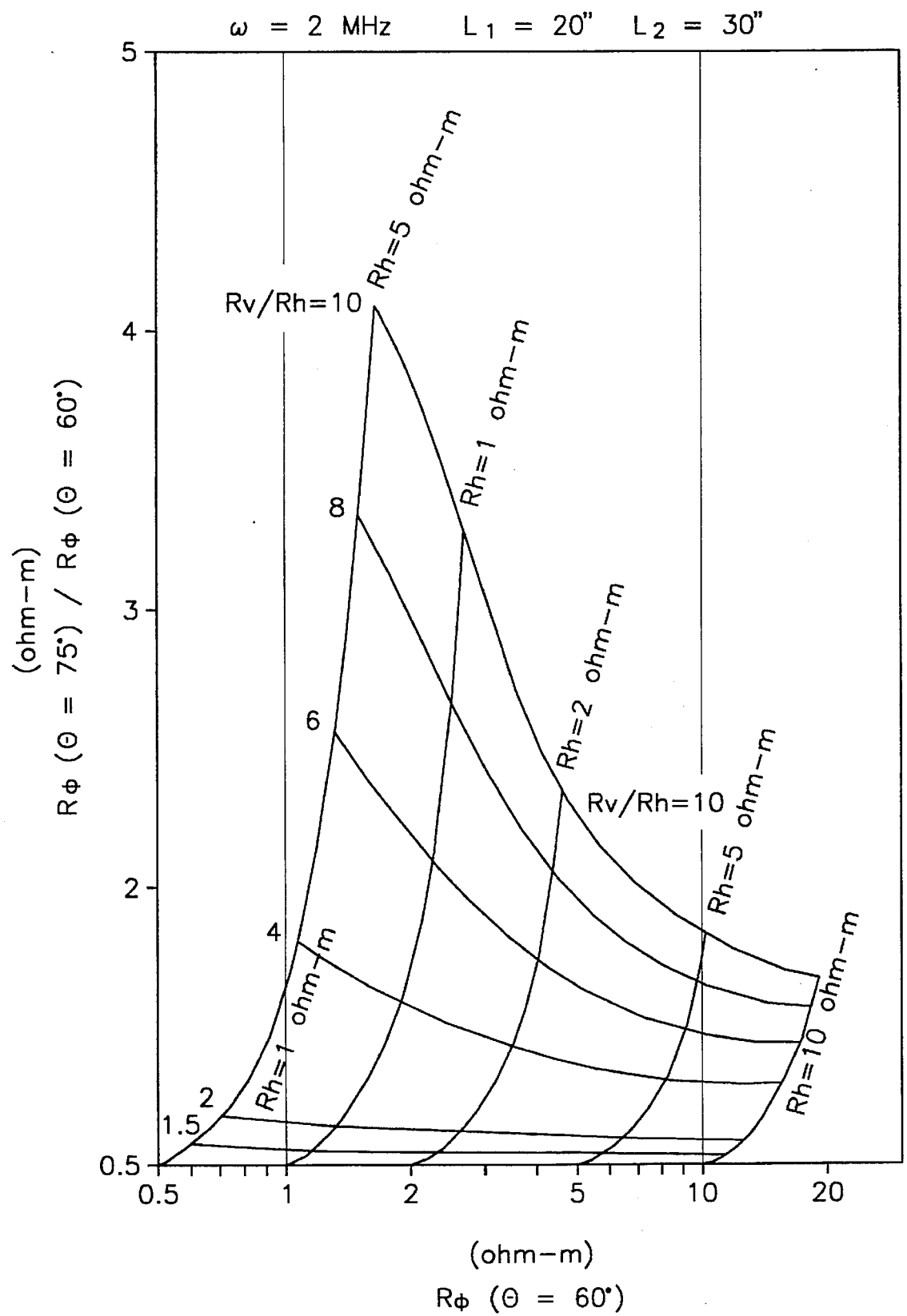
FIG. 16 is a graphical illustration of a typical exemplary relationship between the phase shift derived resistivity $R_\Phi$ for a first deviation angle $\theta_1$, the ratio of the phase shift derived resistivity $R_\Phi$ for a second deviation angle $\theta_2$ to the phase shift derived resistivity $R_\Phi$ for a first deviation angle $\theta_1$, the horizontal resistivity $R_h$, and the anisotropy coefficient $\alpha$.

FIG. 16 illustrates a typical exemplary relationship between the phase shift derived resistivity $R_\phi$ for a first deviation angle of $\theta_1=60°$, the ratio of the phase shift derived resistivity $R_\phi$ for a second deviation angle $\theta_2=75°$ to the phase shift derived resistivity $R_\varphi$ for a first deviation angle $\theta_1=60°$, the horizontal resistivity $R_h$, and the anisotropy coefficient $\lambda$ (which is $1/\alpha$) for a CWR induction type logging tool, having a unique proportionality constant $\tau$ determined during an initial calibration, operating at a frequency of 2 MHz, for a transmitter-receiver spacing of $L_1=20''$ and $L_2=30''$.

The exemplary relationships illustrated in FIGS. 13–16 are generated by means of equations (2), (3), and (4) above using conventional computational algorithms. Similar relationships are generated and stored in the random access memory of the programmed CPU 105 and utilized, in the form of a lookup table, to determine the horizontal resistivity $R_h$, the vertical resistivity $R_v$, and the anisotropy coefficient $\alpha$ for a subterranean formation as a function of the phase shift derived resistivity $R_\varphi$ or the attenuation derived resistivity $R_A$ for two deviation angles $\theta$, for an operating frequency $\omega$, obtained at a given deviation transmitter-receiver spacing, and for a particular induction type logging tool 85 having a proportionality constant $\tau$ determined during an initial calibration.

In a preferred embodiment, the variation of the deviation angle $\theta$ ranges from at least approximately 50°, for an initial deviation angle $\theta$ of approximately 0°, to at least approximately 30°, for an initial deviation angle $\theta$ of approximately 50° to 60° between the repetitive measurements of the phase shift derived resistivity $R_\varphi$ or the attenuation derived resistivity $R_A$. This degree of variation provides optimal computation of the relationship between the horizontal resistivity $R_h$, the vertical resistivity $R_v$, and the anisotropy coefficient $\alpha$; $\alpha$, and the phase shift derived resistivity $R_\varphi$ or the attenuation derived resistivity $R_A$ for two different deviation angles $\theta$ for conventional induction type logging tools.

Figure 17:
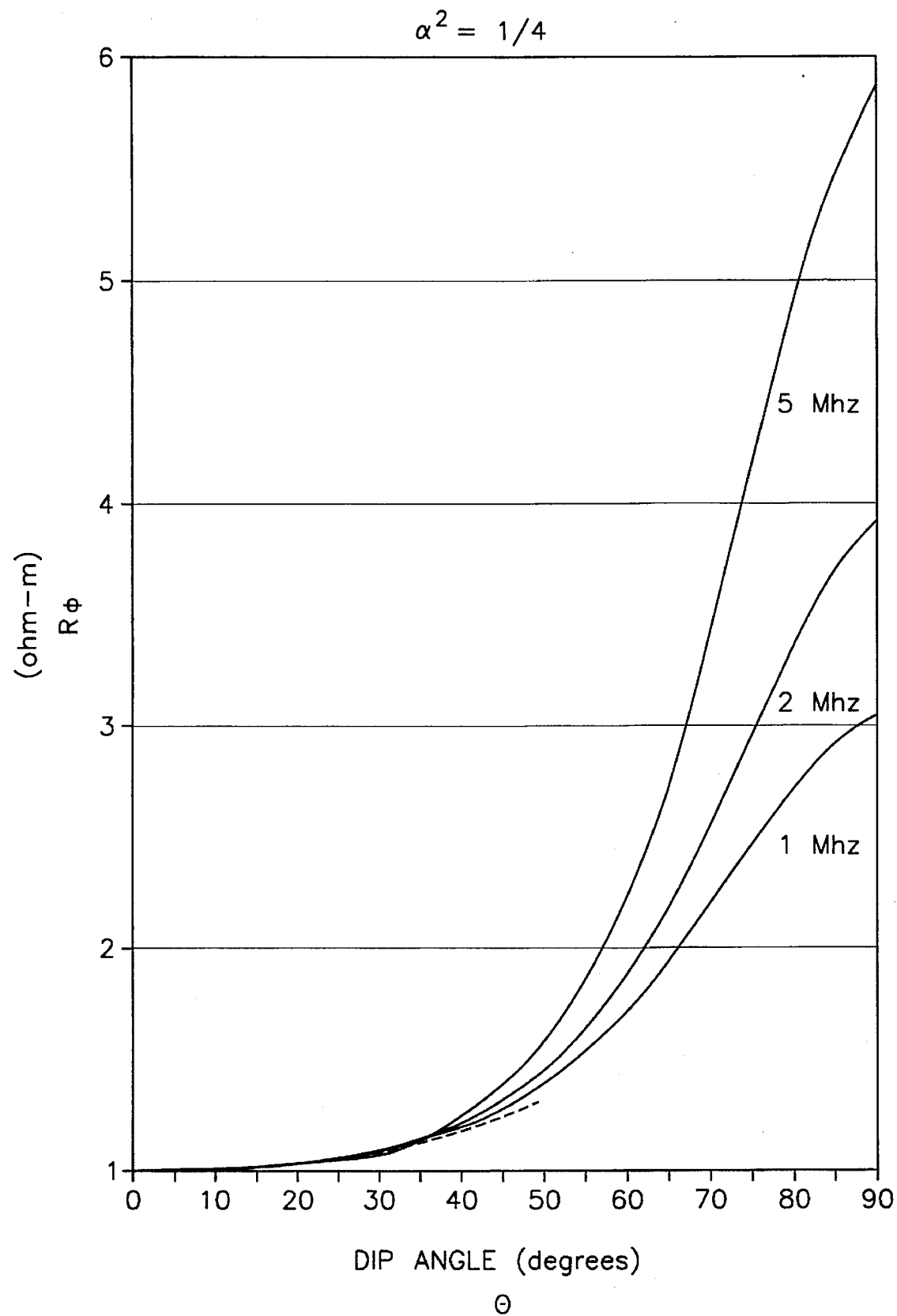
FIG. 17 is a graphical illustration of the effect of anisotropy, as a function of the operating frequency $\omega$ and the deviation angle $\theta$, on the phase shift derived resistivity $R_\Phi$ for an induction type logging tool for a fixed set of transmitter-receiver spacings.

FIG. 17 illustrates the effect of anisotropy, as a function of the operating frequency $\omega$ and the deviation angle $\theta$, on the phase shift derived resistivity $R_\varphi$ for a CWR LWD induction type logging tool, for a predetermined transmitter-receiver spacing, for a range of operating frequencies from 1 MHz to 5 MHz, in a deviated borehole for an anisotropic formation with anisotropy $\alpha^2=\frac{1}{4}$, resulting in a 1 ohm-m horizontal resistivity $R_h$ and a 4 ohm-m vertical resistivity $R_v$. At high deviation angles $\theta$, the phase shift derived resistivity $R_\varphi$ is much higher at higher operating frequencies.

Figure 18:
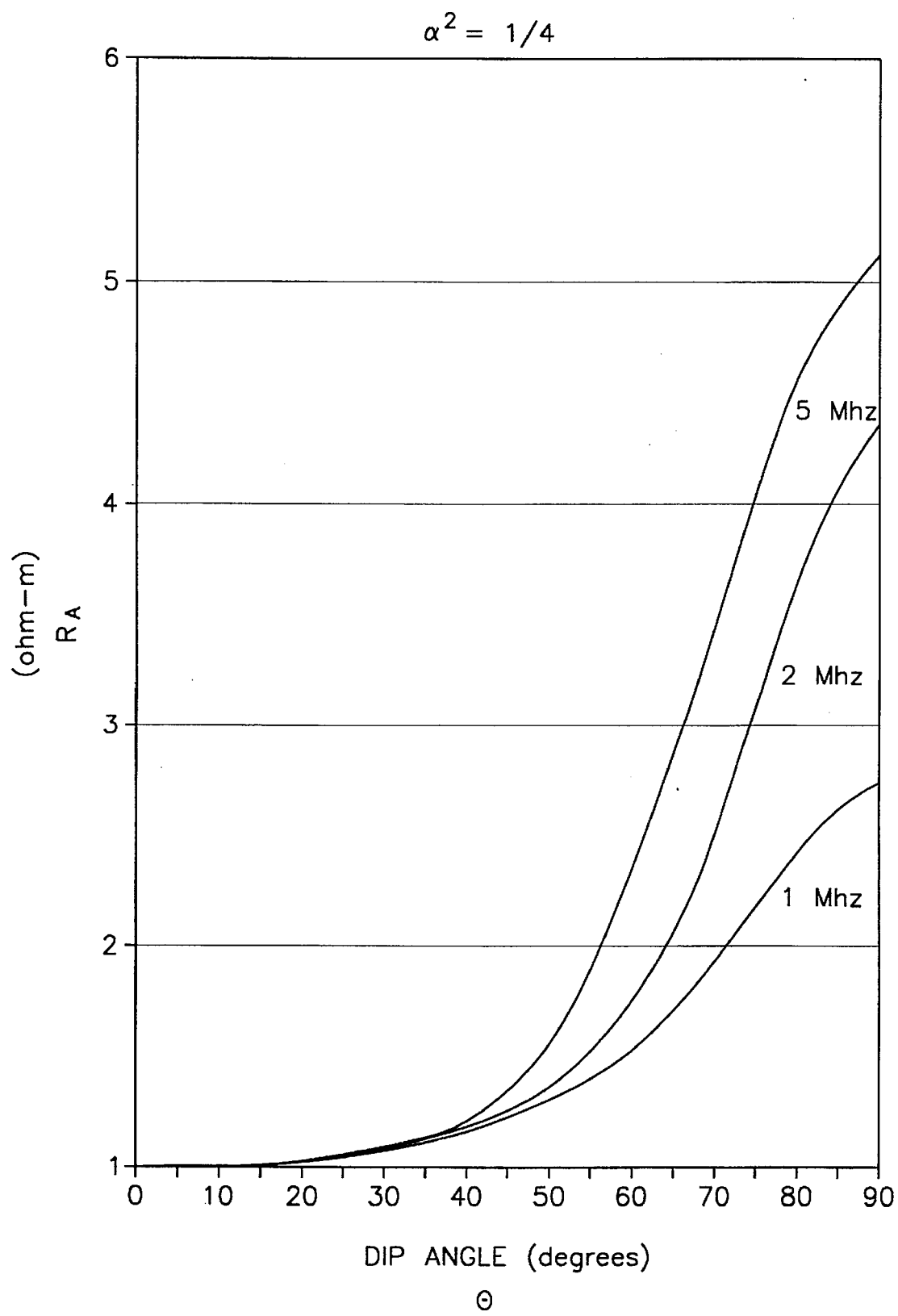
FIG. 18 is a graphical illustration of the effect of anisotropy, as a function of the operating frequency $\omega$ and the deviation angle $\theta$, on the attenuation derived resistivity $R_A$ for an induction type logging tool for a fixed set of transmitter-receiver spacings.

FIG. 18 illustrates the effect of anisotropy, as a function of the operating frequency $\omega$ and the deviation angle $\theta$, on the attenuation derived resistivity $R_A$ for a CWR LWD induction type logging tool, for a predetermined transmitter-receiver spacing, for a range of operating frequencies from 1 MHz to 5 MHz, in a deviated borehole for an anisotropic formation with anisotropy $\alpha^2=\frac{1}{4}$, resulting in a 1 ohm-m horizontal resistivity $R_h$ and a 4 ohm-m vertical resistivity $R_v$. At high deviation angles $\theta$, the attenuation derived resistivity $R_A$ is much higher at higher operating frequencies.

The differences in, and between, the phase shift derived resistivity $R_\varphi$ and the attenuation derived resistivity $R_A$ for different operating frequencies can be utilized by means of equations (2), (3), and (4) above to determine the formation anisotropy as illustrated in FIGS. 19–22.

Figure 19:
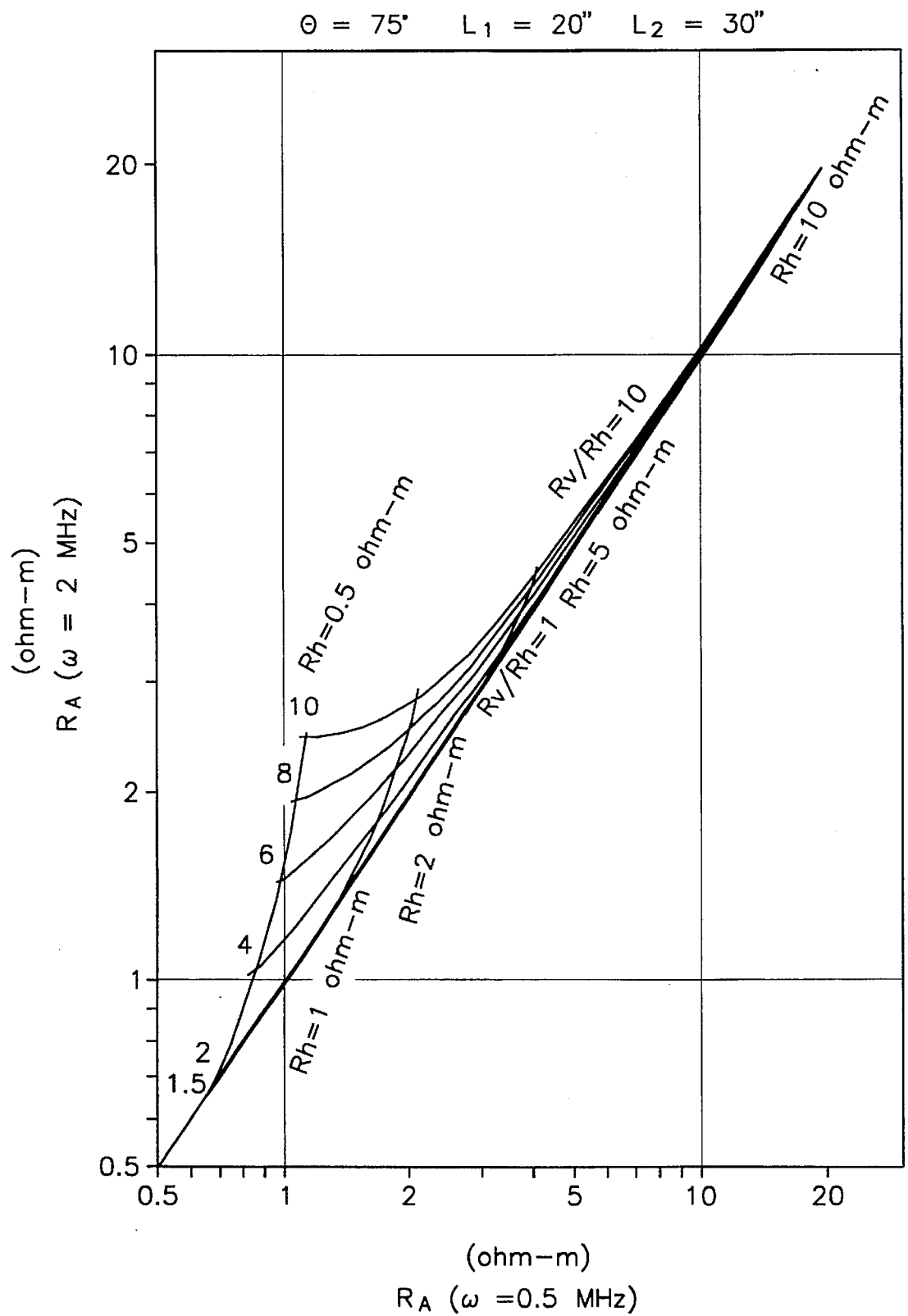
FIG. 19 is a graphical illustration of a typical exemplary relationship between the attenuation derived resistivity $R_A$ for a first operating frequency, the attenuation derived resistivity $R_A$ for a second operating frequency, the horizontal resistivity $R_h$, and the anisotropy coefficient $\alpha$.

FIG. 19 illustrates a typical exemplary relationship between the attenuation derived resistivity $R_A$ for a first operating frequency of $\omega_1=0.5$ MHz, the attenuation derived resistivity $R_A$ for a second operating frequency of $\omega_2=2$ MHz, the horizontal resistivity $R_h$, and the anisotropy coefficient $\lambda$ (which is $1/\alpha$) for a CWR induction type logging tool, which permits variable operating frequencies, having a unique proportionality constant $\tau$ determined during an initial calibration, at a deviation $\theta$ of 75°, with a transmitter-receiver spacing of $L_1=20''$ and $L_2=30''$.

Figure 20:
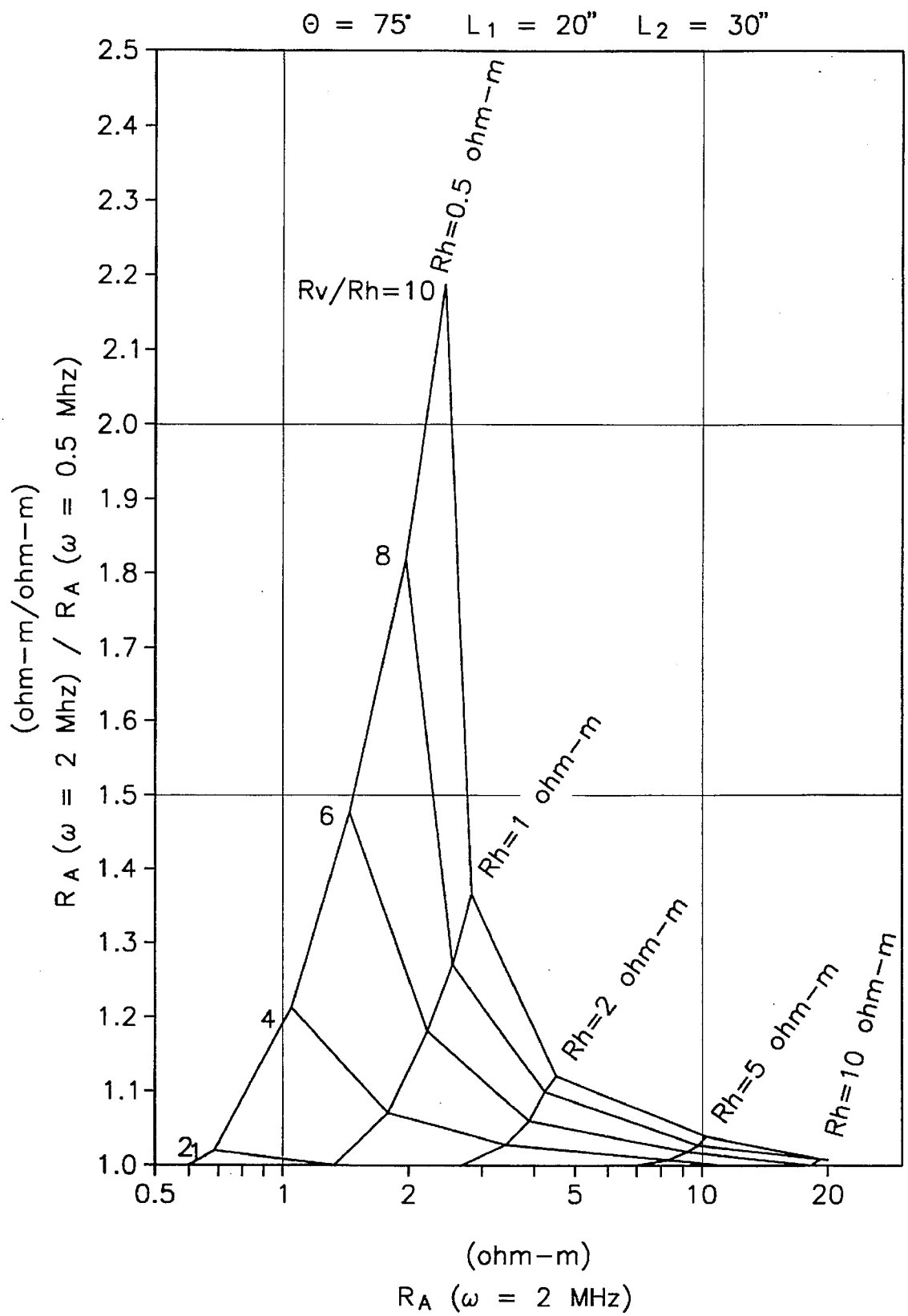
FIG. 20 is a graphical illustration of a typical exemplary relationship between the attenuation derived resistivity $R_A$ for a first operating frequency, the ratio of the attenuation derived resistivity $R_A$ for the first operating frequency to the attenuation derived resistivity $R_A$ for a second operating frequency, the horizontal resistivity $R_h$, and the anisotropy coefficient $\alpha$.

FIG. 20 illustrates a typical exemplary relationship between the attenuation derived resistivity $R_A$ for a first operating frequency of $\omega_1=2$ MHz, the ratio of the attenuation derived resistivity $R_A$ for the first operating frequency of $\omega_1=2$ MHz to the attenuation derived resistivity $R_A$ for a second operating frequency of $\omega_1=0.5$ MHz, the horizontal resistivity $R_h$, and the anisotropy coefficient $\lambda$(which is $1/\alpha$) for a CWR induction type logging tool, which permits variable operating frequencies, having a unique proportionality constant $\tau$ determined during an initial calibration, at a deviation $\theta$ of 75°, with a transmitter-receiver spacing of $L_1=20''$ and $L_2=30''$.

Figure 21:
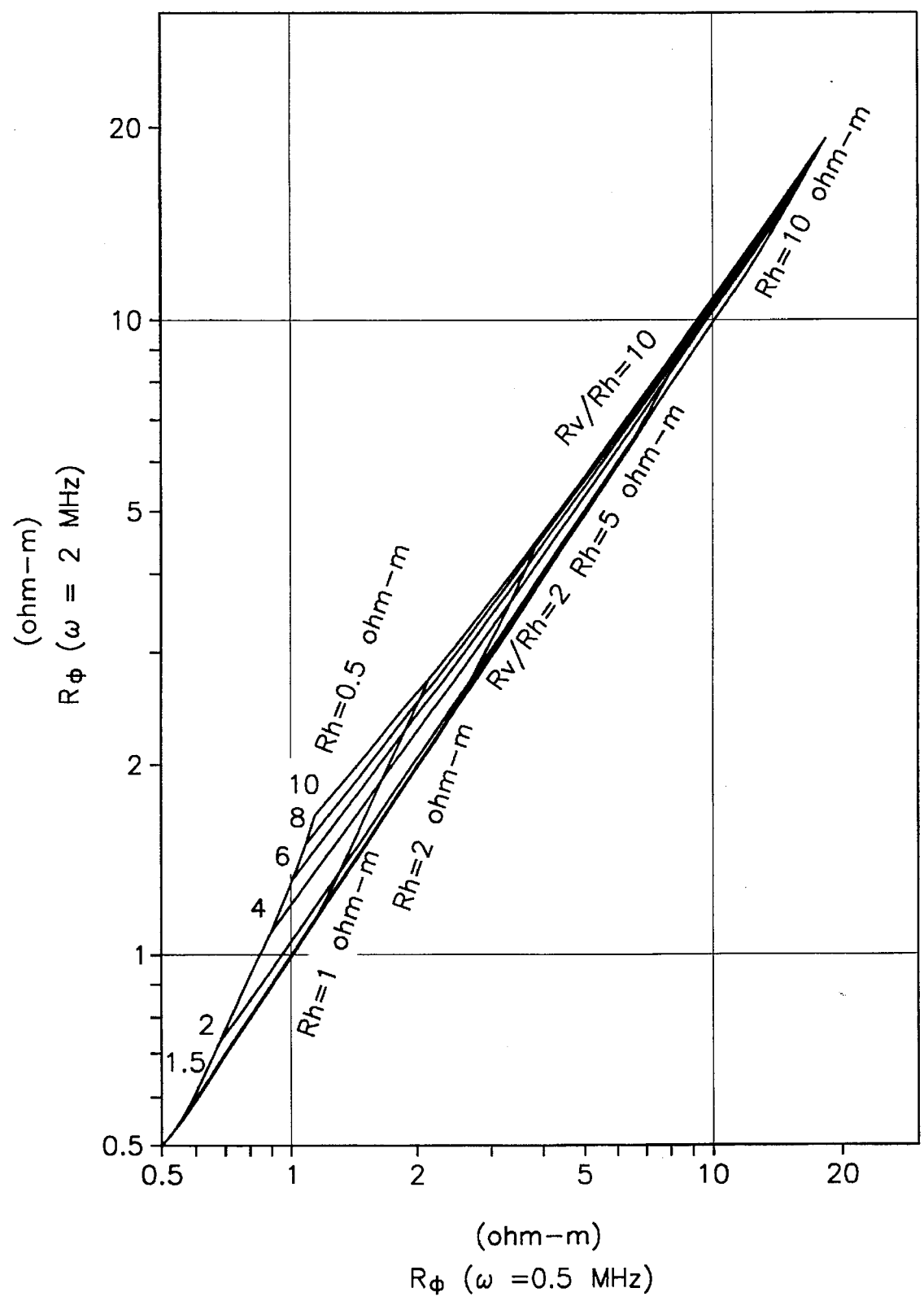
FIG. 21 is a graphical illustration of a typical exemplary relationship between the phase shift derived resistivity $R_\Phi$ for a first operating frequency, the phase shift derived resistivity $R_\Phi$ for a second operating frequency, the horizontal resistivity $R_h$, and the anisotropy coefficient $\alpha$.

FIG. 21 illustrates a typical exemplary relationship between the phase shift derived resistivity $R_\varphi$ for a first operating frequency of $\omega_1=0.5$ MHz, the phase shift derived resistivity $R_\varphi$ for a second operating frequency of $\omega_2=2$ MHz, the horizontal resistivity $R_h$, and the anisotropy coefficient $\lambda$ (which is $1/\alpha$) for a CWR induction type logging tool, which permits variable operating frequencies, having a unique proportionality constant $\tau$ determined during an initial calibration, available from Halliburton Energy Services Inc. of Houston, Tex., at a deviation $\theta$ of 60°, with a transmitter-receiver spacing of $L_1=20''$ and $L_2=30''$.

Figure 22:
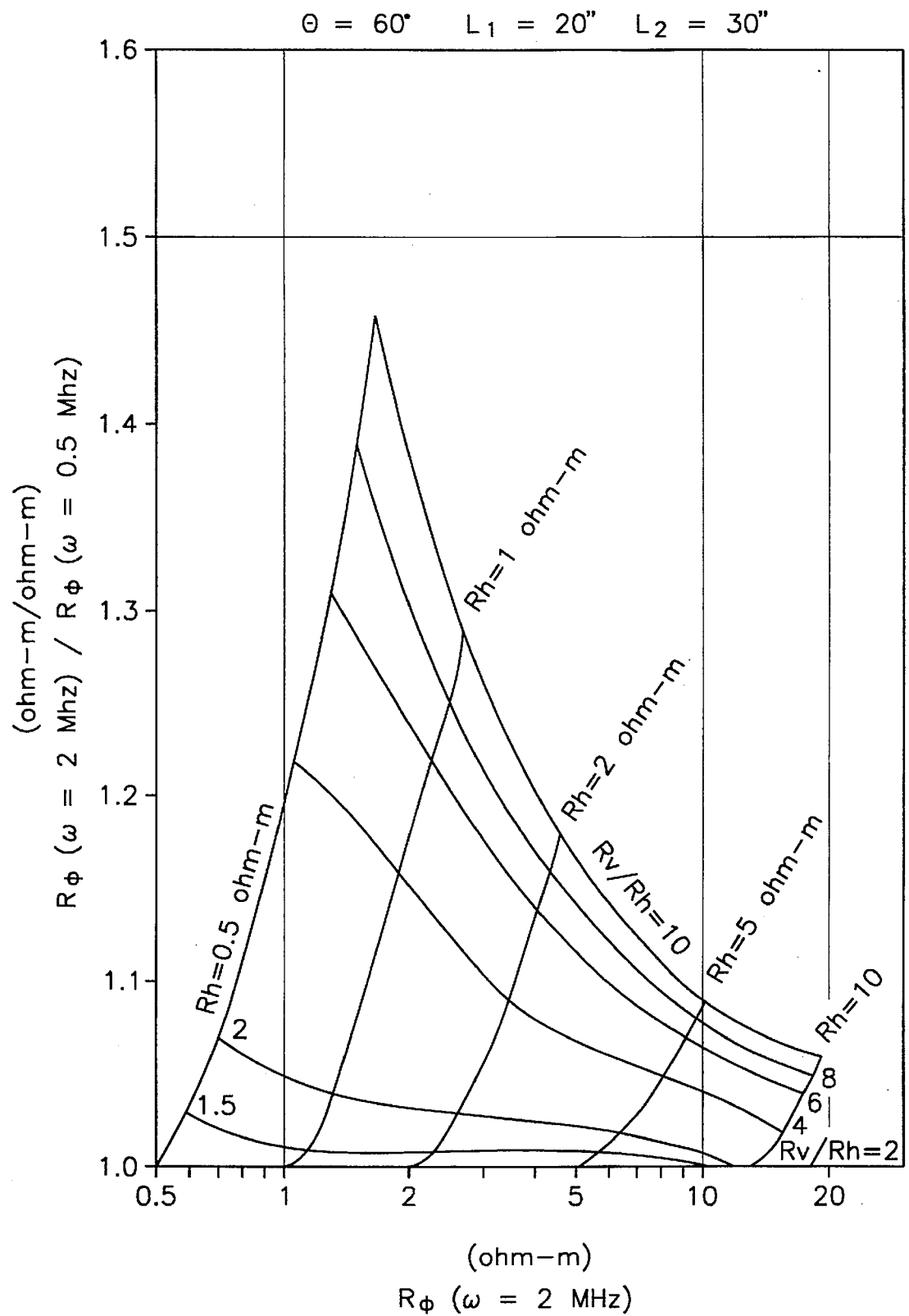
FIG. 22 is a graphical illustration of a typical exemplary relationship between the phase shift derived resistivity $R_\Phi$ for a first operating frequency, the ratio of the phase shift derived resistivity $R_\Phi$ for the first operating frequency to the phase shift derived resistivity $R_\Phi$ for a second operating frequency, the horizontal resistivity $R_h$, and the anisotropy coefficient $\alpha$.

FIG. 22 illustrates a typical exemplary relationship between the phase shift derived resistivity $R_\varphi$ for a first operating frequency of $\omega_1=2$ MHz, the ratio of the phase shift derived resistivity $R_\varphi$ for the first operating frequency of $\omega_1=2$ MHz to the phase shift derived resistivity $R_\varphi$ for a second operating frequency of $\omega_2=0.5$ MHz, the horizontal resistivity $R_h$, and the anisotropy coefficient $\lambda$ (which is $1/\alpha$) for a CWR induction type logging tool, which permits variable operating frequencies, having a unique proportionality constant $\tau$ determined during an initial calibration, at a deviation $\theta$ of 60°, with a transmitter-receiver spacing of $L_1=20''$ and $L_2=30''$.

The exemplary relationships illustrated in FIGS. 19–22 are generated by means of equations (2), (3), and (4) above using conventional computational algorithms. Similar relationships are generated and stored in the random access memory of the programmed CPU 105 and utilized, in the form of a lookup table, to determine the horizontal resistivity $R_h$, the vertical resistivity $R_v$, and the anisotropy coefficient $\alpha$ for a subterranean formation as a function of the phase shift derived resistivity $R_\varphi$ or the attenuation derived resistivity $R_A$ for two different operating frequencies, $\omega_1$ and $\omega_2$, obtained at a given deviation $\theta$, for a particular induction type logging tool 85 having a proportionality constant $\tau$ determined during an initial calibration, with predetermined transmitter-receiver spacings $L_1$ and $L_2$.

In a preferred embodiment, the variation in the operating frequency $\omega$ ranges from approximately 1 MHz to 2 MHz between the repetitive measurements of the phase shift derived resistivity $R_\varphi$ or the attenuation derived resistivity $R_A$. This degree of variation provides optimal computation of the relationship between the horizontal resistivity $R_h$, the vertical resistivity $R_v$, and the anisotropy coefficient $\alpha$, and the phase shift derived resistivity $R_\varphi$ or the attenuation derived resistivity $R_A$ for two different operating frequencies $\omega$ for conventional induction type logging tools.

Thus the exemplary relationships illustrated in FIGS. 7–16, and 19–22, utilized in the form of lookup tables stored in the random access memory of the programmed central processing unit 100, permit the horizontal resistivity $R_h$, the vertical resistivity $R_v$, and the anisotropy coefficient $\alpha$ for a subterranean formation to be determined as a function of the phase shift derived resistivity $R_\varphi$ and the attenuation derived resistivity $R_A$ obtained from an induction type logging tool 85 positioned within a deviated borehole 15 (or within a vertical borehole intersecting a dipping bed formation). For a particular induction type logging tool 85, with particular operating parameters, such as $\omega$, $\theta$, $L_1$, and $L_2$, relationships similar to the exemplary relationships illustrated in FIGS. 7–16, and 19–22 are generated and stored in the random access memory of the programmed central processing unit 100.

Figure 23:
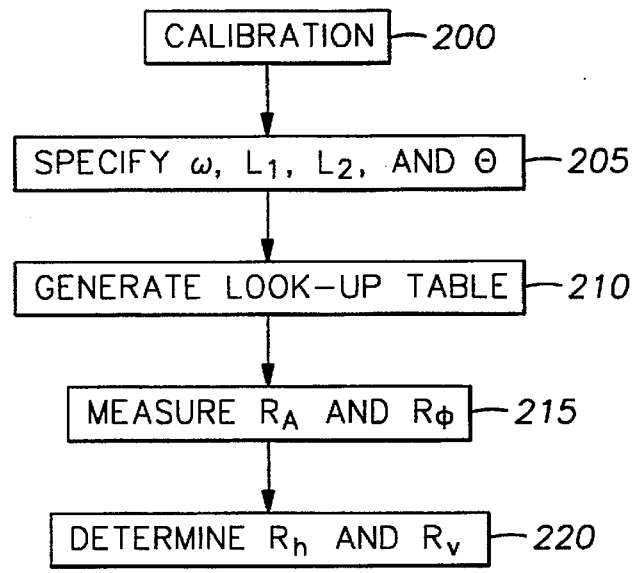
FIG. 23 illustrates the steps involved in determining the horizontal resistivity $R_h$, the vertical resistivity $R_v$, and the anisotropy coefficient $\alpha$ for a subterranean formation as a function of the phase shift derived resistivity $R_\Phi$ and the attenuation derived resistivity $R_A$ utilizing lookup tables incorporating the exemplary relationships illustrated in FIGS. 7 and 8.

FIG. 23 illustrates the steps involved in one preferred implementation of determining the horizontal resistivity $R_h$, the vertical resistivity $R_v$, and the anisotropy coefficient $\alpha$ for a subterranean formation as a function of the phase shift derived resistivity $R_\varphi$ and the attenuation derived resistivity $R_A$ utilizing lookup tables incorporating the relationships graphically illustrated in FIGS. 7 and 8. After an initial calibration of the induction type logging tool 85 to determine the proportionality constant $\tau$ in step 200, the operating parameters of $\omega$, $L_1$ and $L_2$, and $\theta$ are specified in step 205. A lookup table is then generated relating the horizontal resistivity $R_h$, the vertical resistivity $R_v$, the phase shift derived resistivity $R_\varphi$ and the attenuation derived resistivity $R_A$ in step 210. The attenuation derived resistivity $R_A$ and the phase shift derived resistivity $R_\varphi$ are then measured in step 215. Finally, the horizontal resistivity $R_h$ and the vertical resistivity $R_v$ are then determined by means of the measured values and the generated lookup table in step 220.

Figure 24:
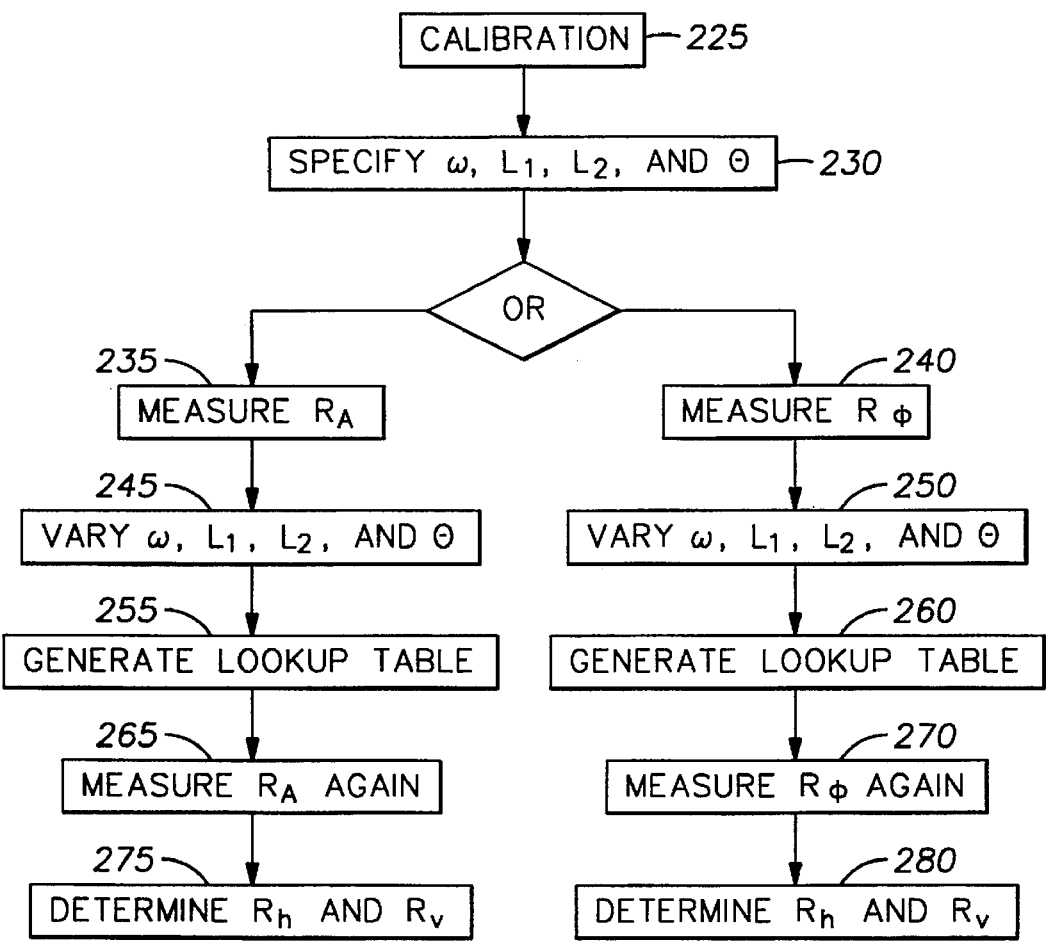
FIG. 24 illustrates the steps involved in determining the horizontal resistivity $R_h$, the vertical resistivity $R_v$, and the anisotropy coefficient $\alpha$ for a subterranean formation as a function of the phase shift derived resistivity $R_\Phi$ and the attenuation derived resistivity $R_A$ utilizing lookup tables incorporating the exemplary relationships illustrated in FIGS. 9–16, and 19–22.

FIG. 24 illustrates the steps involved in another preferred implementation of determining the horizontal resistivity $R_h$, the vertical resistivity $R_v$, and the anisotropy coefficient $\alpha$ for a subterranean formation as a function of the phase shift derived resistivity $R_\varphi$ and the attenuation derived resistivity $R_A$ utilizing lookup tables incorporating the graphical relationships illustrated in FIGS. 9–16, and 19–22. After an initial calibration of the induction type logging tool 85 to determine the proportionality constant $\tau$ in step 225, the operating parameters of $\omega$, $L_1$ and $L_2$, and $\theta$ are specified in step 230. The attenuation derived resistivity $R_A$ or the phase shift derived resistivity $R_\varphi$ is then measured in steps 235 or 240. One of the operating parameters of $\omega$, $L_1$ and $L_2$, and $\theta$ are then varied in steps 245 or 250. A lookup table is then generated relating the horizontal resistivity $R_h$ and the vertical resistivity $R_v$ to the phase shift derived resistivity $R_\varphi$ or to the attenuation derived resistivity $R_A$ for a variation in an operating parameter in steps 255 or 260. The attenuation derived resistivity $R_A$ or the phase shift derived resistivity $R_\varphi$ is then measured again in steps 265 or 270. Finally, the horizontal resistivity $R_h$ and the vertical resistivity $R_v$ are then determined by means of the measured values and the generated lookup table in steps 275 or 280.

For a macroscopically anisotropic subterranean formation that is a laminated formation, the horizontal resistivity $\sigma_h$ and the vertical resistivity $\sigma_v$ are then further processed by the programmed central processing unit 105 to generate the individual laminae resistivities $R_i$ and thicknesses $\Delta_i$ as follows.

Any induction type logging tool sees an anisotropically structured formation (such as a thinly laminated formation) as a homogeneous but macroscopically anisotropic formation when the structure scale (laminae thickness, for example) is thinner than the tool resolution. A thinly laminated sand/shale sequence is one such example because no conventional induction type logging tools resolve individual lamina.

A laminated formation is characterized by two spatially directed averaged resistivities. One is in the direction parallel to the lamination, $R_{parallel}$ (or $R_{horizontal}$, assuming horizontal layers), and the other in terms direction perpendicular to the lamination, $R_{perpendicular}$ (or $R_{vertical}$). In terms of individual laminae resistivity $R_i$ and thickness $\Delta_i$, $$\frac{1}{R_{horizontal}} = \frac{\Sigma \frac{\Delta_i}{R_i}}{\Sigma \Delta_i}, \quad R_{vertical} = \frac{\Sigma \Delta_i R_i}{\Sigma \Delta_i} \quad (6)$$

or, in terms of conductivity:

$$\sigma_{horizontal} = \frac{\Sigma \Delta_i \sigma_i}{\Sigma \Delta_i}, \quad \frac{1}{\sigma_{vertical}} = \frac{\Sigma \frac{\Delta_i}{\sigma_i}}{\Sigma \Delta_i}. \quad (7)$$

As these horizontal and vertical resistivities differ from each other, the formation is macroscopically anisotropic, and anisotropy is calculated by:

$$\alpha^2 = \frac{\sigma_{vertical}}{\sigma_{horizontal}} = \frac{R_{horizontal}}{R_{vertical}}, \quad \alpha^2 \leq 1. \quad (8)$$

A thinly laminated sand/shale sequence is a particularly important example of a macroscopically anisotropic formation. If all of the sand laminae in the formation have an identical resistivity $R_{sand}$, and all of the shale laminae have an identical resistivity $R_{shale}$, the formation is characterized by these two sand and shale layer resistivities, $R_{sand}$ and $R_{shale}$, and the net/gross ratio N/G (which is equal to the sand thickness divided by the total formation thickness). The formation anisotropic resistivities are then determined in terms of these by the following relationships:

$$\frac{1}{R_{horizontal}} = \left(\frac{N}{G}\right)\frac{1}{R_{sand}} + \left(1 - \frac{N}{G}\right)\frac{1}{R_{shale}}; \text{ and} \quad (9)$$

$$R_{vertical} = \left(\frac{N}{G}\right) R_{sand} + \left(1 - \frac{N}{G}\right) R_{shale}. \quad (10)$$

The relationships expressed in equations (9) and (10) may then be inverted to arrive at the following closed form expressions for the net/gross ratio N/G and the sand layer resistivity $R_{sand}$:

$$R_{sand} = R_{horizontal} \frac{\frac{R_{vertical}}{R_{shale}} - 1}{-\frac{R_{horizontal}}{R_{shale}} + 1}; \text{ and} \quad (11)$$

$$\frac{N}{G} = \frac{R_{vertical} - R_{shale}}{R_{sand} - R_{shale}}. \quad (12)$$

Figure 25:
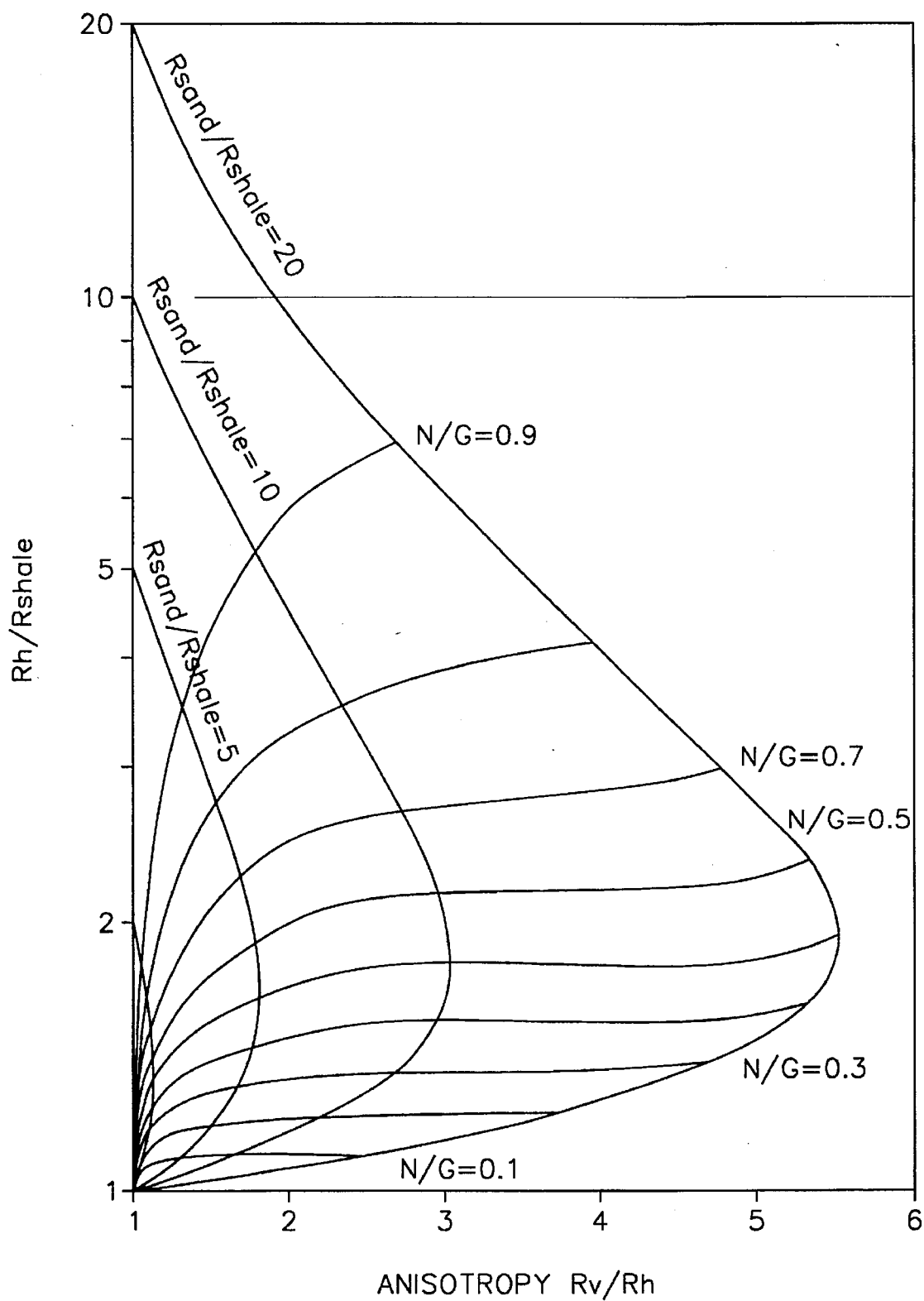
FIG. 25 is a graphical illustration of a typical exemplary relationship between the horizontal resistivity $R_h$, the vertical resistivity $R_v$, the anisotropy coefficient $\alpha$, the ratio of the sand layer resistivity $R_{sand}$ to the shale layer resistivity $R_{shale}$, and the net/gross ratio N/G for a thinly laminated sand/shale sequence.

FIG. 25 illustrates a typical relationship between the anisotropy coefficient $\alpha$, the horizontal resistivity $R_h$, the vertical resistivity $R_v$, the ratio of the sand layer resistivity $R_{sand}$ to the shale layer resistivity $R_{shale}$, and the net/gross ratio N/G. The exemplary relationship illustrated in FIG. 25 is generated by means of equations (9) and (10), or by means of equations (11) and (12), using conventional computational algorithms. This relationship is stored in the random access memory of the programmed CPU 105 and utilized, in the form of a lookup table, to determine the ratio of the sand layer resistivity $R_{sand}$ to the shale layer resistivity $R_{shale}$, and the net/gross ratio N/G as a function of the anisotropy coefficient $\alpha$, the horizontal resistivity $R_h$, and the vertical resistivity $R_v$, for a subterranean formation consisting of a thinly laminated sand/shale sequence.

Figure 26:
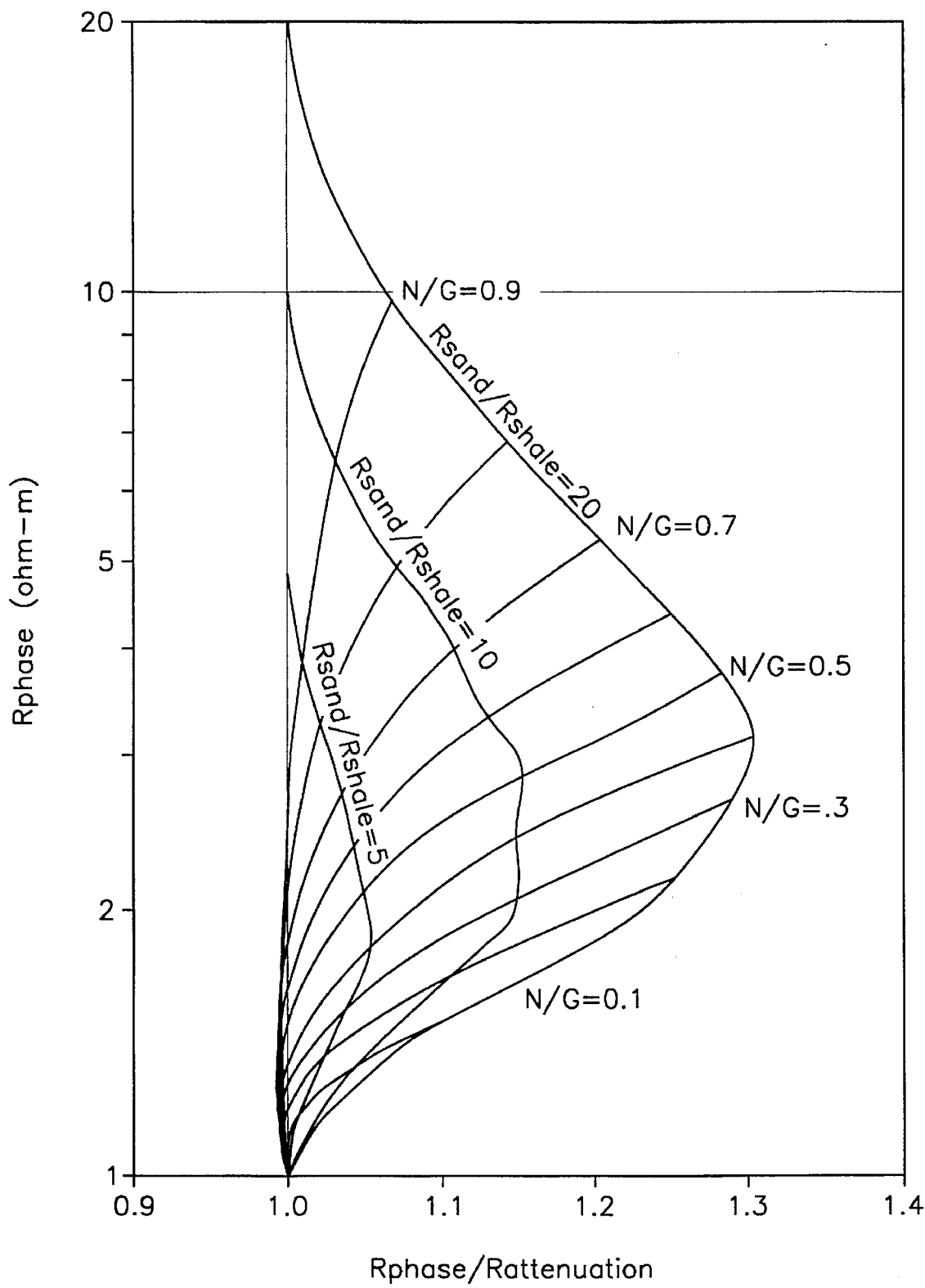
FIG. 26 is a graphical illustration of a typical exemplary relationship between the phase shift derived resistivity $R_\Phi$, the attenuation derived resistivity $R_A$, the ratio of the sand layer resistivity $R_{sand}$ to the shale layer resistivity $R_{shale}$, and the net/gross ratio N/G for a thinly laminated sand/shale sequence.

FIG. 26 illustrates a typical relationship between the phase shift derived resistivity $R_\varphi$, the attenuation derived resistivity $R_A$ the ratio of the sand layer resistivity $R_{sand}$ to the shale layer resistivity $R_{shale}$, and the net/gross ratio N/G for a thinly laminated sand/shale sequence. The exemplary relationship illustrated in FIG. 26 is generated by means of equations (2), (3), (4), (9), and (10), or by means of equations (2), (3), (4), (11), and (12), using conventional computational algorithms. This relationship is stored in the random access memory of the programmed CPU 105 and utilized, in the form of a lookup table, to determine the ratio of the sand layer resistivity $R_{sand}$ to the shale layer resistivity $R_{shale}$, and the net/gross ratio N/G as a function of the attenuation derived resistivity $R_A$, and the phase shift derived resistivity $R_\Phi$ for a subterranean formation consisting of a thinly laminated sand/shale sequence.

The shale layer resistivity $R_{shale}$ is determined by means of a separate measurement with the induction type logging tool 80 positioned within the shale layer itself, above or below the thinly laminated sequence, or by means of a measurement made within a nearby well borehole for the shale layer. The sand layer resistivity $R_{sand}$ is then determined by means of the ratio of $R_{sand}$ to $R_{shale}$ determined from the relationships illustrated in FIGS. 25 and 26.

Figure 27:
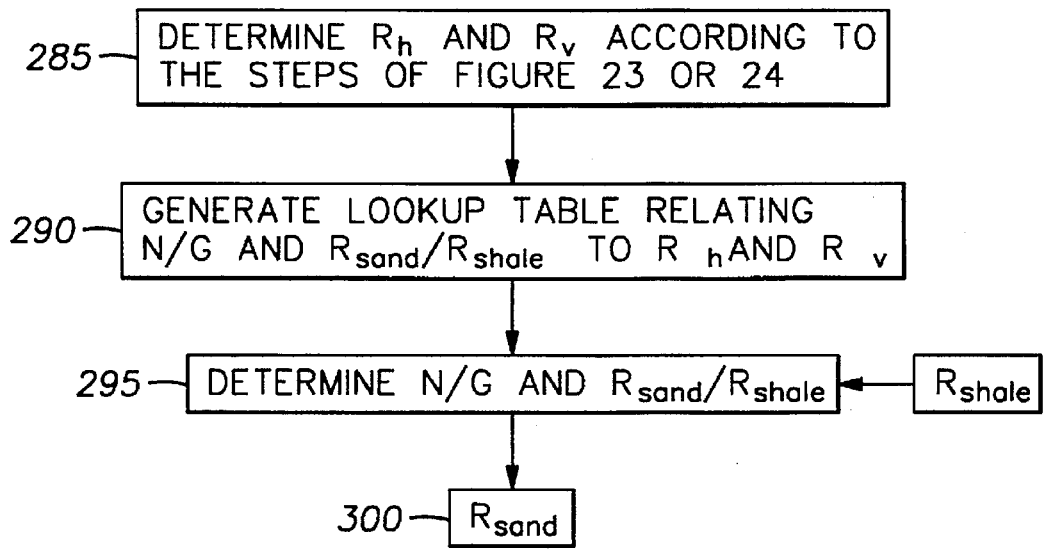
FIG. 27 illustrates the steps involved in determining the sand layer resistivity $R_{sands}$, and the net/gross ratio N/G for a subterranean formation as a function of the horizontal resistivity $R_h$, the vertical resistivity $R_v$, and the shale layer resistivity $R_{shale}$ utilizing lookup tables incorporating the exemplary relationships illustrated in FIGS. 7–16, 19–22, and 25.

FIG. 27 illustrates the steps involved in a preferred implementation of determining the horizontal resistivity $R_h$, the vertical resistivity $R_v$, the anisotropy coefficient $\alpha$, the sand layer resistivity $R_{sand}$, the shale layer resistivity $R_{shale}$, and the net/gross ratio N/G for a subterranean formation as a function of the phase shift derived resistivity $R_\Phi$ and/or the attenuation derived resistivity $R_A$ utilizing lookup tables incorporating the relationships illustrated graphically in FIGS. 7–16, 19–22, and 25. The horizontal resistivity $R_h$ and the vertical resistivity $R_v$ are first determined by means of the steps of FIG. 23 or of FIG. 24 in step 285. A lookup table is then generated relating the horizontal resistivity $R_h$, the vertical resistivity $R_v$, the ratio of the sand layer resistivity $R_{sand}$ to the shale layer resistivity $R_{shale}$, and the net/gross ratio N/G in step 290. The net/gross ratio, N/G, and the ratio of the sand layer resistivity $R_{sand}$ to the shale layer resistivity $R_{shale}$ are then determined by means of the lookup table in step 295. Finally, the sand layer resistivity Rsand is determined from the ratio of the sand layer resistivity $R_{sand}$ to the shale layer resistivity $R_{shale}$ and a measured value for the shale layer resistivity $R_{shale}$ in step 300.

Figure 28:
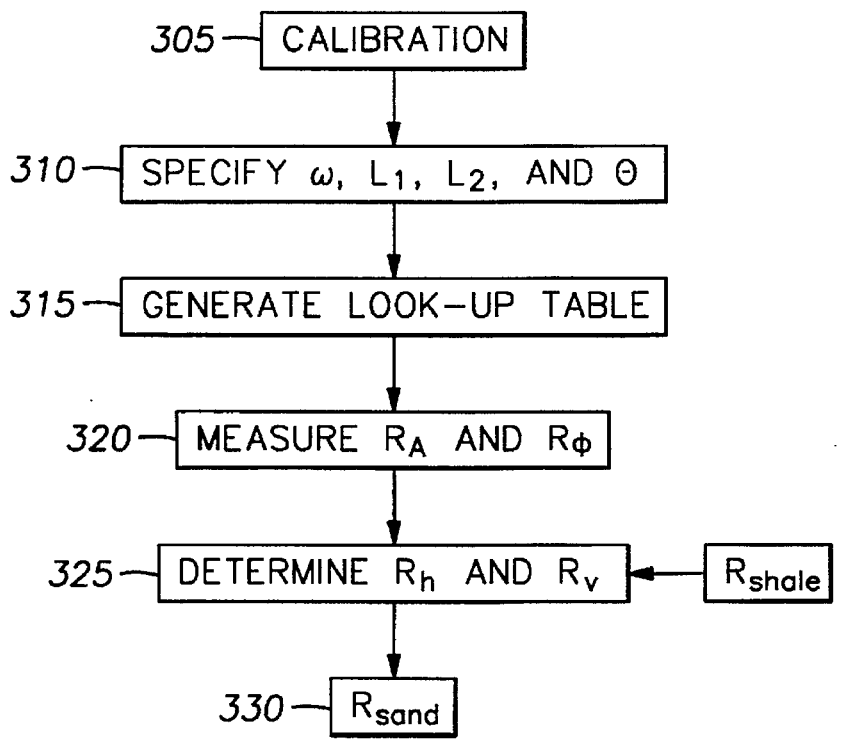
FIG. 28 illustrate the steps involved in determining the sand layer resistivity $R_{sand}$, and the net/gross ratio N/G for a subterranean formation as a function of the phase shift derived resistivity $R_\Phi$ and the attenuation derived resistivity $R_A$ utilizing lookup tables incorporating the exemplary relationships illustrated in FIG. 26.

FIG. 28 illustrates the steps involved in a preferred implementation of determining the sand layer resistivity $R_{sand}$, the shale layer resistivity $R_{shale}$, and the net/gross ratio N/G for a subterranean formation as a function of the phase shift derived resistivity $R_\Phi$ and the attenuation derived resistivity $R_A$ utilizing lookup tables incorporating the relationship graphically illustrated in FIG. 26. After an initial calibration of the induction type logging tool 85 to determine the proportionality constant $\tau$ in step 305, the operating parameters of $\omega$, $L_1$ and $L_2$, and $\theta$ are specified in step 310. A lookup table is then generated relating the phase shift derived resistivity $R_\Phi$, the attenuation derived resistivity $R_A$, the ratio of the sand layer resistivity $R_{sand}$ to the shale layer resistivity $R_{shale}$, and the net/gross ratio N/G in step 315. The attenuation derived resistivity $R_A$ and the phase shift derived resistivity $R_\Phi$ are then measured in step 320. The ratio of the sand layer resistivity $R_{sand}$ to the shale layer resistivity $R_{shale}$ and the net/gross ratio N/G are then determined from the measured values and the generated lookup table in step 325. Finally, the sand layer resistivity $R_{sand}$ is determined from the determined ratio of the sand layer resistivity $R_{sand}$ to the shale layer resistivity $R_{shale}$ and a measured value for the shale layer resistivity $R_{shale}$ in step 330.

When the shale laminae are known to be microscopically anisotropic, the formation anisotropic resistivities are then determined in terms of the following relationships:

$$\frac{1}{R_{horizontal}} = \left(\frac{N}{G}\right)\frac{1}{R_{sand}} + \left(1 - \frac{N}{G}\right)\frac{1}{R_{shale,horizontal}} \quad ; \text{and} \quad (13)$$

$$R_{vertical} = \left(\frac{N}{G}\right) R_{sand} + \left(1 - \frac{N}{G}\right) R_{shale,vertical} . \quad (14)$$

Where the horizontal shale resistivity $R_{shale,horizontal}$ is different from the vertical shale resistivity $R_{shale,vertical}$.

The relationships expressed in equations (13) and (14) may then be inverted to arrive at the following closed form expressions for the net/gross ratio N/G and the sand layer resistivity $R_{sand}$:

$$\text{letting } R^0_{sand} = R_{horizontal}\frac{\frac{R_{vertical}}{R_{shale,vertical}} - 1}{1 - \frac{R_{horizontal}}{R_{shale,horizontal}}} \quad ; \quad (15)$$

$$\text{then } R_{sand} = R^0_{sand}\left\{1 + \frac{1}{2}\left[\frac{R^0_{sand}}{R_{shale,horizontal}} - 1 - \sqrt{\left(\frac{R^0_{sand}}{R_{shale,horizontal}} - 1\right)^2 + 4\frac{R^0_{sand}}{R_{shale,horizontal}}\left(\frac{R_{shale,horizontal}}{R_{shale,vertical}} - 1\right)}\right]\right\}^{-1} \quad ; \text{and} \quad (16)$$

$$\frac{N}{G} = \frac{R_{vertical} - R_{shale,vertical}}{R_{sand} - R_{shale,vertical}} . \quad (17)$$

Figure 29:
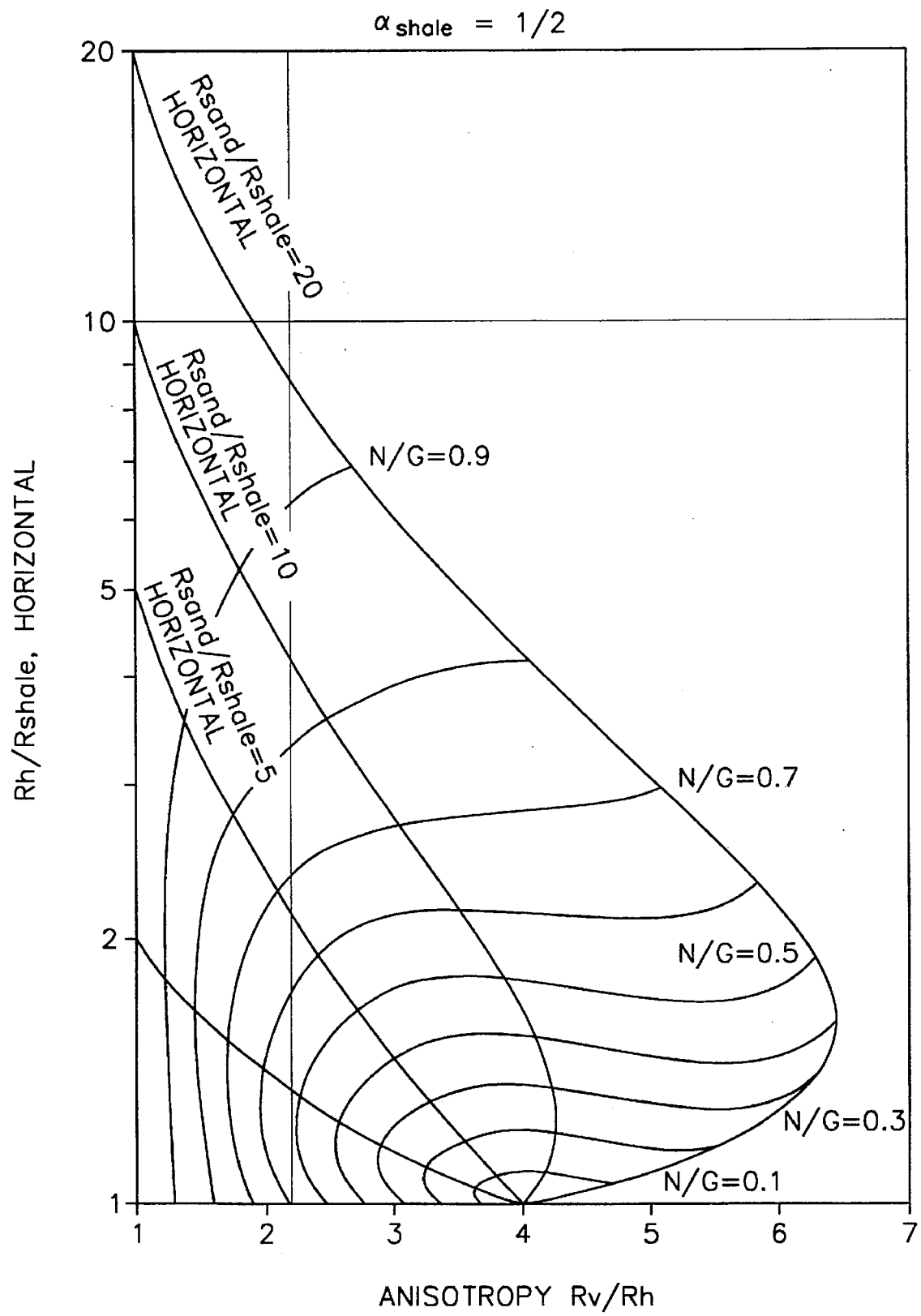
FIG. 29 is a graphical illustration of a typical exemplary relationship between the horizontal resistivity $R_h$, the vertical resistivity $R_v$, the ratio of the sand layer resistivity $R_{sand}$ to the horizontal shale layer resistivity $R_{shale,horizontal}$, and the net/gross ratio N/G for a thinly laminated sand/shale sequence including a microscopically anisotropic shale layer having an anisotropy coefficient $\alpha_{shale}$ of ½.

FIG. 29 illustrates a typical relationship between the horizontal resistivity $R_h$, the vertical resistivity $R_v$, the ratio of the sand layer resistivity $R_{sand}$ to the horizontal shale layer resistivity $R_{shale,horizontal}$, and the net/gross ratio N/G for a thinly laminated sand/shale sequence including a microscopically anisotropic shale layer having an anisotropy coefficient $\alpha_{shale}$ equal to ½. The exemplary relationship illustrated in FIG. 29 is generated by means of equations (13) and (14), or by means of equations (15), (16), and (17), using conventional computational algorithms. This relationship is stored in the random access memory of the programmed CPU 105 and utilized, in the form of a lookup table, to determine the ratio of the sand layer resistivity $R_{sand}$ to the horizontal shale layer resistivity $R_{shale,horizontal}$, and the net/gross ratio N/G as a function of the horizontal resistivity $R_h$, and the vertical resistivity $R_v$, for a subterranean formation consisting of a thinly laminated sand/shale sequence with a shale layer that is microscopically anisotropic.

Figure 30:
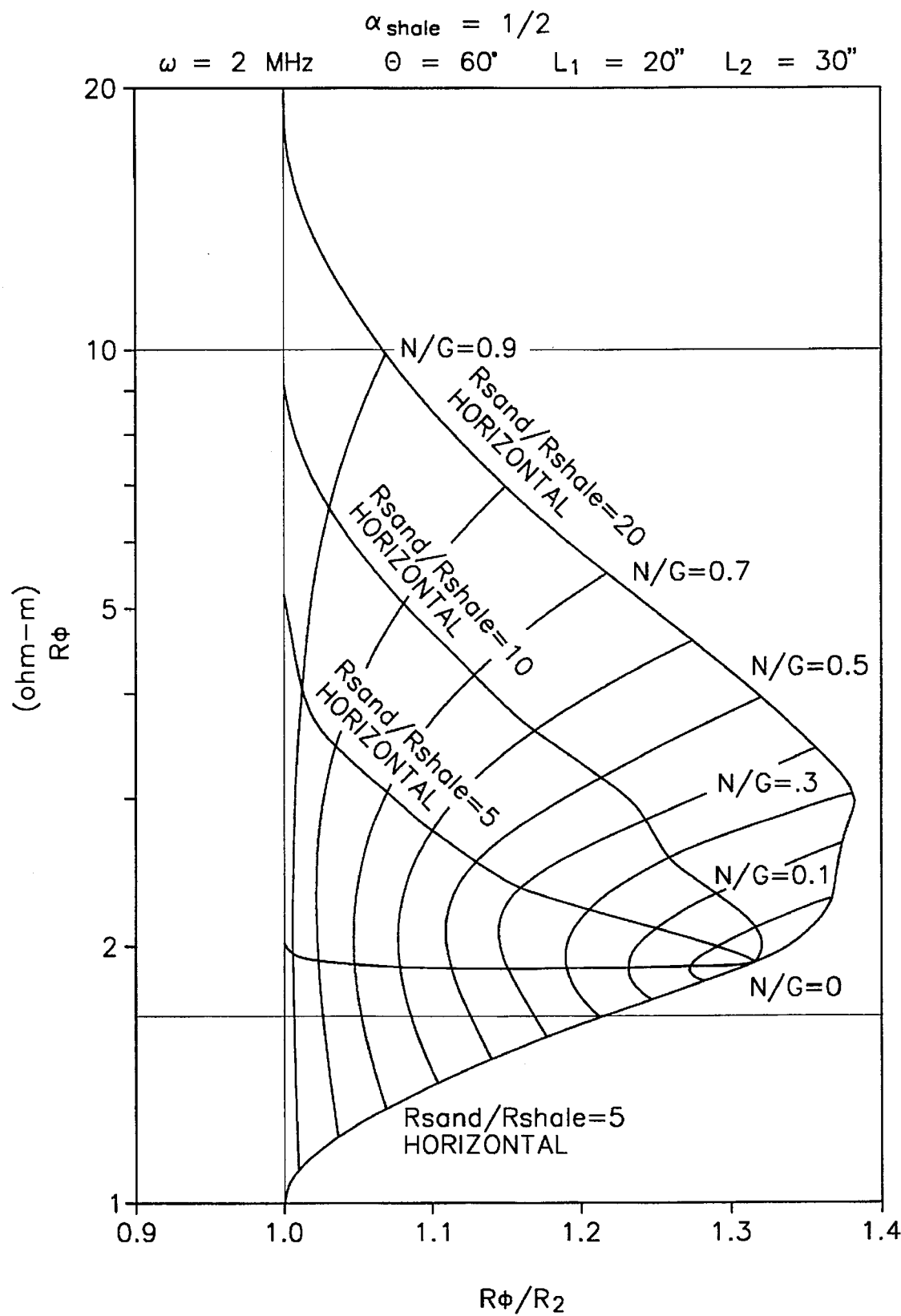
FIG. 30 is a graphical illustration of a typical exemplary relationship between the phase shift derived resistivity $R_\Phi$, the attenuation derived resistivity $R_A$, the ratio of the sand layer resistivity $R_{sand}$ to the horizontal shale layer resistivity $R_{shale,horizontal}$, and the net/gross ratio N/G for a thinly laminated sand/shale sequence including a microscopically anisotropic shale layer having an anisotropy coefficient $\alpha_{shale}$ of ½.

FIG. 30 illustrates a typical relationship between the phase shift derived resistivity $R_\Phi$, the attenuation derived resistivity $R_A$, the ratio of the sand layer resistivity $R_{sand}$ to the horizontal shale layer resistivity $R_{shale,horizontal}$, and the net/gross ratio N/G for a thinly laminated sand/shale sequence including a microscopically anisotropic shale layer having an anisotropy coefficient $\alpha_{shale}$ equal to ½. The exemplary relationship illustrated in FIG. 30 is generated by means of equations (2), (3), (4), (13), and (14), or by means of equations (2), (3), (4), (15), (16), and (17), using conventional computational algorithms. This relationship is stored in the random access memory of the programmed CPU 105 and utilized, in the form of a lookup table, to determine the ratio of the sand layer resistivity $R_{sand}$ to the horizontal shale layer resistivity $R_{shale,horizontal}$, and the net/gross ratio N/G as a function of the attenuation derived resistivity $R_A$, and the phase shift derived resistivity $R_\Phi$, for a subterranean formation consisting of a thinly laminated sand/shale sequence with a shale layer that is microscopically anisotropic.

The horizontal shale layer resistivity $R_{shale,horizontal}$, the vertical shale layer resistivity $R_{shale,vertical}$, and the shale layer anisotropy coefficient $\alpha_{shale}$ are determined by means of a separate measurement with the induction type logging tool 85 positioned within the shale layer itself, above or below the thinly laminated sequence, or by means of a measurement made within a nearby well borehole for the shale layer. This separate measurement utilizes the method steps illustrated in FIGS. 23 or 24 since the shale layer itself is a homogeneous formation.

The sand layer resistivity $R_{sand}$ is then determined by means of the ratio of $R_{sand}$ to $R_{shale,horizontal}$ determined from the relationships illustrated in FIGS. 29 or 30.

Figure 31:
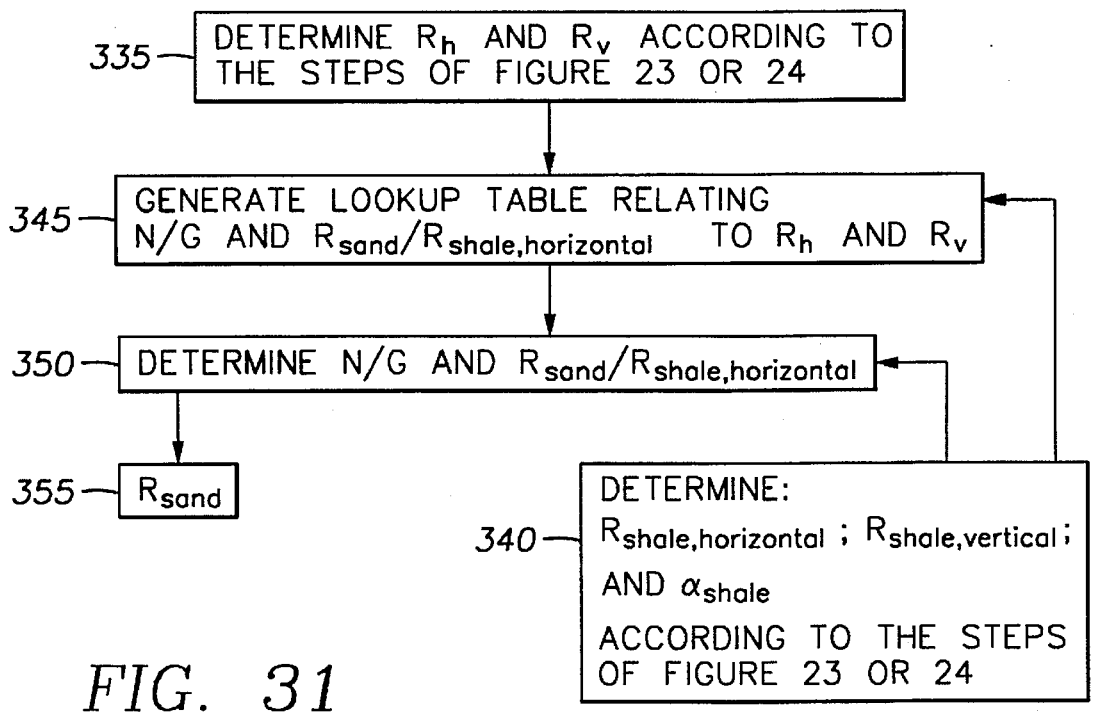
FIG. 31 illustrates the steps involved in determining the sand layer resistivity $R_{sand}$, the ratio of the sand layer resistivity $R_{sand}$ to the horizontal shale layer resistivity $R_{shale,horizontal}$, and the net/gross ratio N/G from the horizontal resistivity $R_h$, the vertical resistivity $R_v$, the horizontal shale layer resistivity $R_{shale,horizontal}$ for a subterranean formation utilizing lookup tables incorporating the exemplary relationships illustrated in FIGS. 7–16, 19–22, and 29.

FIG. 31 illustrates the steps involved in a preferred implementation of determining the horizontal resistivity $R_h$, the vertical resistivity $R_v$, the anisotropy coefficient $\alpha$, the sand layer resistivity $R_{sand}$, and the net/gross ratio N/G for a subterranean formation as a function of the phase shift derived resistivity $R_\Phi$ and the attenuation derived resistivity $R_A$ utilizing lookup tables incorporating the exemplary relationships graphically illustrated in FIGS. 7–16, 19–22, and 29. The horizontal resistivity $R_h$ and the vertical resistivity $R_v$ are first determined according to the steps illustrated in FIG. 23 or FIG. 24 in step 335. The shale layer horizontal resistivity $R_{shale,horizontal}$, the shale layer vertical resistivity $R_{shale,vertical}$, and the shale layer anisotropy coefficient $\alpha_{shale}$ are then determined according to the steps illustrated in FIG. 23 or FIG. 24 by means of a separate measurement with the induction type logging tool 85 positioned within the shale layer in step 340. A lookup table is then generated relating the net/gross ratio, the ratio of the sand layer resistivity $R_{sand}$ to the horizontal shale layer resistivity $R_{shale,horizontal}$ the horizontal resistivity $R_h$, and the vertical resistivity $R_v$ in step 345. The net/gross ratio and the ratio of the sand layer resistivity $R_{sand}$ to the horizontal shale layer resistivity $R_{shale,horizontal}$ are then determined by means of the generated lookup table in step 350. Finally, the sand layer resistivity $R_{sand}$ is determined from the determined ratio of the sand layer resistivity $R_{sand}$ to the horizontal shale layer resistivity $R_{shale,horizontal}$ and the measured value for the horizontal shale layer resistivity $R_{shale,horizontal}$ in step 355.

Figure 32:
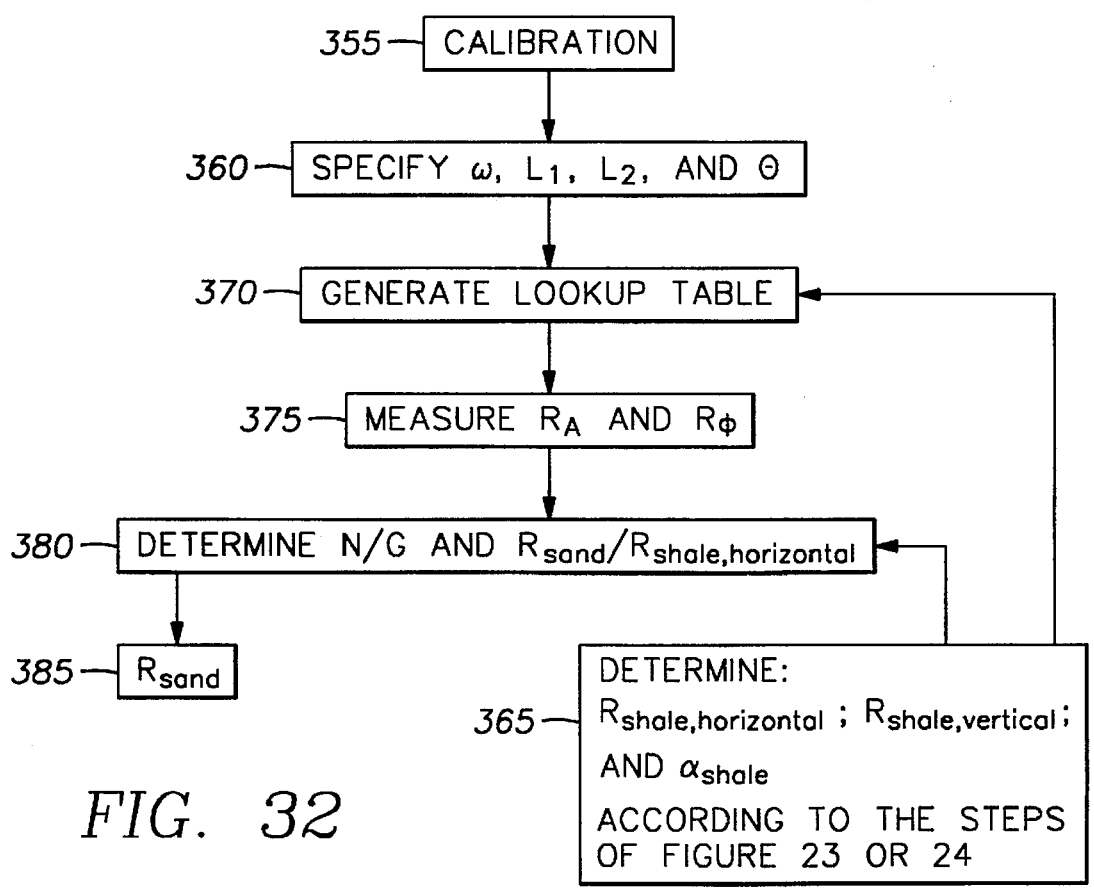
FIG. 32 illustrates the steps involved in determining the ratio of the sand layer resistivity $R_{sand}$ to the horizontal shale layer resistivity $R_{shale,horizontal}$ and the net/gross ratio N/G for a subterranean formation as a function of the phase shift derived resistivity $R_\Phi$ and the attenuation derived resistivity $R_A$ utilizing lookup tables incorporating the exemplary relationships illustrated in FIG. 30.

FIG. 32 illustrates the steps involved in another preferred implementation of determining the sand layer resistivity $R_{sand}$, the ratio of the sand layer resistivity $R_{sand}$ to the horizontal shale layer resistivity $R_{shale,horizontal}$, and the net/gross ratio N/G for a subterranean formation as a function of the phase shift derived resistivity $R_\Phi$ and the attenuation derived resistivity $R_A$ utilizing lookup tables incorporating the exemplary relationships graphically illustrated in FIG. 30. After an initial calibration of the induction type logging tool 85 to determine the proportionality constant $\tau$ in step 355, the operating parameters of $\omega$, $L_1$, $L_2$, and $\theta$ are specified in step 360. The shale layer horizontal resistivity $R_{shale,horizontal}$, the shale layer vertical resistivity $R_{shale,vertical}$, and the shale layer anisotropy coefficient $\alpha_{shale}$ are then determined according to the steps illustrated in FIG. 23 or FIG. 24 by means of a separate measurement with the induction type logging tool 85 positioned within the shale layer in step 365. A lookup table is then generated relating the net/gross ratio, the ratio of the sand layer resistivity $R_{sand}$ to the horizontal shale layer resistivity $R_{shale,horizontal}$, the attenuation derived resistivity $R_A$, and the phase shift derived resistivity $R_\Phi$ in step 370. The attenuation derived resistivity $R_A$ and the phase shift derived resistivity $R_\Phi$ are then measured in step 375. The net/gross ratio and the ratio of the sand layer resistivity $R_{sand}$ to the horizontal shale layer resistivity $R_{shale,horizontal}$ are then determined by means of the measured values and the generated lookup table in step 380. Finally, the sand layer resistivity $R_{sand}$ is determined from the determined ratio of the sand layer resistivity $R_{sand}$ to the horizontal shale layer resistivity $R_{shale,horizontal}$ and the measured value for the horizontal shale layer resistivity $R_{shale,horizontal}$ in step 385.

A method for determining the anisotropic properties of a subterranean formation using an induction type logging tool has been described for use in oil and gas exploration. The method provides a means of determining the anisotropic properties of a subterranean formation by processing the output signals of a conventional induction type logging tool positioned within a deviated borehole. The method thereby provides the anisotropic properties of a subterranean formation without the need for special equipment dedicated specifically for such a purpose.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

What is claimed is:

1. A method of determining anisotropic properties of a subterranean formation comprising a thinly laminated sand/shale sequence through use of an induction logging tool within a borehole penetrating said formation, said tool having an operating frequency $\omega$, comprising the steps of:

deriving a dip angle for said borehole with respect to said formation;

deriving a phase shift resistivity for said formation;

deriving an attenuation resistivity for said formation;

determining a horizontal resistivity and a vertical resistivity for said formation as a first predetermined function of said phase shift resistivity, said attenuation resistivity and said dip angle;

determining a net/gross ratio and a ratio of a sand layer resistivity to a shale layer resistivity as a function of said horizontal resistivity and said vertical resistivity;

deriving a formation shale layer resistivity; and determining a formation sand layer resistivity as a function of said sand layer resistivity to shale layer resistivity ratio and said formation shale layer resistivity.

2. The method of claim 1, wherein said operating frequency $\omega$ ranges from approximately 400 KHz to approximately 2 MHz.

3. The method of claim 1, wherein said dip angle ranges from approximately 0° to approximately 90°.

4. A method of determining the anisotropic properties of a subterranean formation by means of an induction logging tool within a borehole penetrating said formation, said tool having at least one transmitter and at least two receivers, the distance between a transmitter and a receiver defining a transmitter-receiver spacing and operating parameters including an operating frequency ω and at least two transmitter-receiver spacings, comprising the steps of:

deriving a dip angle for said borehole with respect to said formation;

deriving a first resistivity for said formation;

varying an operating parameter of said logging tool;

deriving a second resistivity for said formation; and determining a horizontal resistivity and a vertical resistivity according to a predetermined relationship between said formation dip angle, said first derived resistivity, said second derived resistivity.

5. The method of claim 4, wherein said first derived resistivity is a first amplitude derived resistivity, and wherein said second derived resistivity is a second amplitude derived resistivity.

6. The method of claim 4, wherein said first derived resistivity is a first phase shift derived resistivity, and wherein said second derived resistivity is a second phase shift derived resistivity.

7. The method of claim 4, wherein said operating frequency ω ranges from approximately 400 KHz to approximately 2 MHz.

8. The method of claim 4, wherein said varied operating parameter is said operating frequency.

9. The method of claim 8, wherein said operating frequency is varied by approximately 1 MHz to 2 MHz.

10. The method of claim 4, wherein said varied operating parameter is said transmitter-receiver spacings.

11. A method of determining anisotropic properties of a subterranean formation comprising a thinly laminated sand/shale sequence through use of an induction logging tool within a borehole penetrating said formation, said logging tool having an operating frequency ω, comprising the steps of:

deriving a dip angle for said borehole with respect to said formation;

deriving a first formation resistivity;

varying an operating parameter of said logging tool;

deriving a second formation resistivity;

determining a horizontal resistivity and a vertical resistivity for said formation as a first predetermined function of said first and second derived formation resistivity and said dip angle;

determining a net/gross ratio and a ratio of a sand layer resistivity to a shale layer resistivity as a function of said horizontal formation resistivity and said vertical formation resistivity;

deriving a formation shale layer resistivity; and determining a formation sand layer resistivity as a function of said net/gross ratio, said formation shale layer resistivity, said formation horizontal resistivity and said formation vertical resistivity.

12. The method of claim 11, wherein said first derived resistivity is a first amplitude derived resistivity, and wherein said second derived resistivity is a second amplitude derived resistivity.

13. The method of claim 11, wherein said first derived resistivity is a first phase shift derived resistivity, and wherein said second derived resistivity is a second phase shift derived resistivity.

14. The method of claim 11, wherein said operating frequency ω ranges from approximately 400 KHz to approximately 2 MHz.

15. The method of claim 11, wherein said dip angle ranges from approximately 0° to approximately 90°.

16. The method of claim 11, wherein said varied operating parameter is said operating frequency.

17. The method of claim 11, wherein said operating frequency is varied by approximately 1 MHz to 2 MHz.

18. The method of claim 11, wherein said varied operating parameter is said transmitter-receiver spacings.

19. A method of determining anisotropic properties of a subterranean formation comprising a thinly laminated same/shale sequence through use of an induction logging tool within a borehole penetrating said formation, said induction logging tool having an operating frequency ω, comprising the steps of:

deriving a dip angle for said borehole with respect to said formation;

establishing a relationship between said dip angle, a phase shift derived resistivity, an attenuation derived resistivity, a ratio of a sand layer resistivity to a shale layer resistivity, and a net/gross ratio;

measuring said phase shift derived resistivity;

measuring said attenuation derived resistivity;

determining said ratio of said sand layer resistivity to said shale layer resistivity, and said net/gross ratio in reference to said established relationship;

measuring said shale layer resistivity; and determining said sand layer resistivity as a function of said sand layer resistivity to shale layer resistivity ratio and said formation shale layer resistivity.

20. The method of claim 19, wherein said operating frequency ω ranges from approximately 400 KHz to approximately 2 MHz.

21. The method of claim 19, wherein said dip angle ranges from approximately 0° to approximately 90°.

22. A method of determining anisotropic properties of a subterranean formation comprising a thinly laminated sand/shale sequence including a microscopically anisotropic shale layer through use of an induction logging tool within a borehole penetrating said formation, said induction logging tool having an operating frequency ω, comprising the steps of:

deriving a dip angle for said borehole relative to said formation;

establishing a first relationship between said dip angle, a horizontal resistivity, a vertical resistivity, a phase shift derived resistivity, and an attenuation derived resistivity;

measuring said phase shift derived resistivity;

measuring said attenuation derived resistivity;

determining said horizontal resistivity and said vertical resistivity in reference to said established first relationship;

determining a horizontal shale layer resistivity and a vertical shale layer resistivity;

establishing a second relationship between a net/gross ratio, a ratio of a sand layer resistivity to said horizontal shale horizontal shale layer resistivity, said horizontal shale layer resistivity, sad vertical shale layer resistivity, sad horizontal resistivity, and said vertical resistivity;

determining said net/gross ratio, and said ratio of said sand layer resistivity to said horizontal shale layer resistivity in reference to said established second relationship; and determining said sand layer resistivity as a function of said sand layer resistivity to shale layer resistivity ratio and said formation shale layer resistivity.

23. The method of claim 22, wherein said operating frequency ω ranges from approximately 400 KHz to approximately 2 MHz.

24. A method of determining anisotropic properties of a subterranean formation comprising a thinly laminated sand/shale sequence including a microscopically anisotropic shale layer by means of an induction logging tool position within a borehole penetrating said formation, said logging tool having at least one transmitter and at least two receivers, the distance between a transmitter and a receiver defining a transmitter-receiver spacing and operating parameters, including an operating frequency ω and at least two transmitter-receiver spacings, comprising the steps of:

establishing a first relationship between said dip angle, a first derived resistivity, a second derived resistivity, a horizontal resistivity, and a vertical resistivity;

measuring said first derived resistivity;

varying an operating parameter of said logging tool;

measuring said second derived resistivity;

determining said horizontal resistivity and said vertical resistivity in reference to said first established relationship;

determining a shale layer resistivity;

establishing a second relationship between said shale layer resistivity, a ratio of a sand layer resistivity to said shale layer resistivity, said shale layer resistivity, and a net/gross ratio;

determining said ratio of said sand layer resistivity to said horizontal shale layer resistivity, and said net/gross ratio in reference to said established second relationship; and determining said sand layer resistivity as a function of said sand layer resistivity to shale layer resistivity ratio and said formation shale layer resistivity.

25. The method of claim 24, wherein said first derived resistivity is a first amplitude derived resistivity, and wherein said second derived resistivity is a second amplitude derived resistivity.

26. The method of claim 24, wherein said first derived resistivity is a first phase shift derived resistivity, and wherein said second derived resistivity is a second phase shift derived resistivity.

27. The method of claim 24, wherein said operating frequency ω ranges from approximately 400 KHz to approximately 2 MHz.

28. The method of claim 24, wherein said varied operating parameter is said operating frequency.

29. The method of claim 28, wherein said operating frequency is varied by approximately 1 MHz to 2 MHz.

30. The method of claim 24, wherein said varied operating parameter is said transmitter-receiver spacings.

31. A method of determining anisotropic properties of a subterranean formation comprising a thinly laminated sand/shale sequence including a microscopically anisotropic shale layer by means of an induction logging tool within a borehole penetrating said formation, said logging tool having an operating frequency ω, comprising the steps of:

deriving a dip angle for said borehole relative to said formation;

determining a horizontal shale layer resistivity and a vertical shale layer resistivity;

establishing a relationship between a phase shift derived resistivity, an attenuation derived resistivity, a ratio of a sand layer resistivity to said horizontal shale layer resistivity, said vertical shale layer resistivity, said horizontal shale layer resistivity, and a net/gross ratio;

measuring said phase shift derived resistivity;

measuring said attenuation derived resistivity;

determining said ratio of said sand layer resistivity to said horizontal shale layer resistivity and said net/gross ratio in reference to said established relationship; and determining said sand layer resistivity as a function of said sand layer resistivity to shale layer resistivity ratio, said horizontal shale layer resistivity, and said vertical shale layer resistivity.

32. The method of claim 31, wherein said operating frequency ω ranges from approximately 400 KHz to approximately 2 MHz.

33. The method of claim 31, wherein said dip angle ranges from approximately 0° to approximately 90°.

* * * * *